(12) United States Patent
Kim et al.

(10) Patent No.: US 10,678,356 B2
(45) Date of Patent: Jun. 9, 2020

(54) TOUCH SENSOR INTEGRATED DISPLAY DEVICE AND METHOD FOR DRIVING THE SAME

(71) Applicant: LG Display Co., Ltd., Seoul (KR)

(72) Inventors: Taegung Kim, Paju-si (KR); Sangho Yu, Paju-si (KR); Hyuckjun Kim, Goyang-si (KR)

(73) Assignee: LG Dislay Co., Ltd., Seoul (KR)

( * ) Notice: Subject to any disclaimer, the term of this patent is extended or adjusted under 35 U.S.C. 154(b) by 230 days.

(21) Appl. No.: 14/981,486

(22) Filed: Dec. 28, 2015

(65) Prior Publication Data

US 2017/0031485 A1 Feb. 2, 2017

(30) Foreign Application Priority Data

Jul. 31, 2015 (KR) .................. 10-2015-0108840

(51) Int. Cl.
　　*G06F 3/041* (2006.01)
　　*G06F 3/044* (2006.01)
　　*G09G 3/3233* (2016.01)
　　*G09G 3/3275* (2016.01)

(52) U.S. Cl.
　　CPC ............ *G06F 3/0412* (2013.01); *G06F 3/044* (2013.01); *G06F 3/0416* (2013.01); *G06F 3/04166* (2019.05); *G06F 3/04184* (2019.05); *G09G 3/3233* (2013.01); *G09G 3/3275* (2013.01); *G09G 2310/0291* (2013.01);
　　(Continued)

(58) Field of Classification Search
　　CPC .................................................. G06F 3/0412
　　See application file for complete search history.

(56) References Cited

U.S. PATENT DOCUMENTS

| 8,232,955 | B2 * | 7/2012 | Kwon | .................. | G09G 3/3406 |
| | | | | | 345/101 |
| 8,493,435 | B2 * | 7/2013 | Kim | .................. | G02B 27/2264 |
| | | | | | 348/41 |
| 9,330,605 | B2 * | 5/2016 | Park | ...................... | G09G 3/3233 |

(Continued)

FOREIGN PATENT DOCUMENTS

| CN | 102738198 A | 10/2012 |
| CN | 103354078 A | 10/2013 |

(Continued)

OTHER PUBLICATIONS

European Extended Search Report, European Application No. 15202906.2, dated Mar. 24, 2016, 9 pages.

(Continued)

*Primary Examiner* — Patrick F Marinelli
(74) *Attorney, Agent, or Firm* — Fenwick & West LLP

(57) ABSTRACT

A disclosed touch sensor integrated display device includes a display panel; and a data drive circuit configured to set a gate-source voltage to turn on a driving TFT in the display panel by applying a data voltage for touch sensing to a gate node of the driving TFT through a data line and a reference voltage to a source node of the driving TFT through a sensing line, during a reset period based on a scan control signal and a sensing control signal, and to output a sensing value by sensing a change in a source-drain current of the driving TFT caused by touch input, during a sensing period subsequent to the reset period.

10 Claims, 34 Drawing Sheets

(52) U.S. Cl.
CPC ... *G09G 2310/08* (2013.01); *G09G 2320/029* (2013.01); *G09G 2320/0233* (2013.01); *G09G 2354/00* (2013.01)

(56) References Cited

U.S. PATENT DOCUMENTS

| | | | |
|---|---|---|---|
| 9,448,676 B2 | 9/2016 | Zhou et al. | |
| 9,495,031 B2* | 11/2016 | Omoto | G06F 3/0412 |
| 9,501,170 B2* | 11/2016 | Wu | G06F 3/0412 |
| 9,530,354 B2* | 12/2016 | Tan | G06F 3/042 |
| 9,648,700 B2* | 5/2017 | Soto | G06F 3/0412 |
| 9,658,710 B2 | 5/2017 | Yang | |
| 10,055,057 B2* | 8/2018 | Kim | G06F 3/0418 |
| 10,185,431 B2* | 1/2019 | Kim | G09G 3/3225 |
| 2008/0157682 A1 | 7/2008 | Kwon | |
| 2008/0224962 A1* | 9/2008 | Kasai | G06F 3/0412 345/76 |
| 2010/0026639 A1* | 2/2010 | Lee | G06F 3/0412 345/173 |
| 2011/0310090 A1 | 12/2011 | Kim et al. | |
| 2012/0154319 A1* | 6/2012 | Konicek | G06F 3/0412 345/173 |
| 2012/0249401 A1 | 10/2012 | Omoto | |
| 2013/0063407 A1* | 3/2013 | Usukura | G06F 3/0412 345/207 |
| 2013/0106828 A1* | 5/2013 | Kim | G09G 3/3233 345/212 |
| 2013/0146881 A1* | 6/2013 | Yamazaki | H01L 27/14623 257/59 |
| 2013/0201173 A1* | 8/2013 | Chaji | G09G 3/3233 345/212 |
| 2013/0221856 A1* | 8/2013 | Soto | G06F 3/0412 315/152 |
| 2014/0118231 A1* | 5/2014 | Yang | G09G 3/3258 345/82 |
| 2014/0168290 A1* | 6/2014 | Yang | G09G 3/3233 345/691 |
| 2015/0138179 A1 | 5/2015 | Park | |
| 2015/0193045 A1 | 7/2015 | Zhou et al. | |
| 2015/0220201 A1 | 8/2015 | Wu et al. | |
| 2015/0302801 A1 | 10/2015 | Tan et al. | |
| 2015/0310793 A1* | 10/2015 | Kawashima | G09G 3/3233 345/174 |
| 2016/0021722 A1* | 1/2016 | Soto | G06F 3/0412 315/152 |
| 2016/0071445 A1* | 3/2016 | Kim | G09G 3/006 345/212 |
| 2016/0240122 A1* | 8/2016 | Yu | G09G 3/3291 |
| 2016/0253014 A1 | 9/2016 | Yang | |
| 2017/0031485 A1* | 2/2017 | Kim | G06F 3/0412 |
| 2017/0038898 A1* | 2/2017 | Kim | G09G 3/3225 |
| 2017/0046006 A1* | 2/2017 | Kim | G02F 1/13338 |

FOREIGN PATENT DOCUMENTS

| | | |
|---|---|---|
| CN | 103383837 A | 11/2013 |
| CN | 104252844 A | 12/2014 |
| CN | 104658474 A | 5/2015 |
| KR | 10-2012-0111678 A | 10/2012 |
| KR | 10-2015-0052606 A | 5/2015 |
| KR | 10-2015-0057672 A | 5/2015 |
| KR | 10-2015-0064798 A | 6/2015 |
| KR | 10-1549343 B1 | 9/2015 |
| KR | 10-1577909 B1 | 12/2015 |
| KR | 10-2016-0001822 A | 1/2016 |
| KR | 10-2016-0007971 A | 1/2016 |
| TW | 201211863 A1 | 3/2012 |
| WO | WO 2014/205950 A1 | 12/2014 |
| WO | WO 2015/000275 A1 | 1/2015 |
| WO | WO 2015/027584 A1 | 3/2015 |

OTHER PUBLICATIONS

Taiwan Office Action, Taiwan Application No. 104144389, dated Aug. 11, 2016, 14 pages.
State Intellectual Property Office of the People's Republic of China, First Office Action, Chinese Patent Application No. 201510998018.X, dated Jun. 28, 2018, eighteen pages.

* cited by examiner (A)

(B)

TOUCH SENSOR INTEGRATED DISPLAY DEVICE AND METHOD FOR DRIVING THE SAME

This application claims the benefit of priority under 35 U.S.C. § 119(a) to Korean Patent Application No. 10-2015-0108840 filed on Jul. 31, 2015, which is incorporated herein by reference for all purposes as if fully asset forth herein.

BACKGROUND

Related Field

The present invention relates to a touch sensor integrated display device and a method for driving the same.

Discussion of the Related Art

Touch sensors are being proposed which enable users to directly touch or get close to the screen and enter data with their finger or a pen while watching displays of a variety of home electronics or data communication devices. The touch sensors are used for various display devices because they are simple to use, have low possibility of malfunction, allow for user input without using an additional input device, and enable the users to operate them quickly and easily through content displayed on the screen.

The touch sensors may be implemented by well-known technologies such as capacitive sensing, infrared (IR) sensing, etc.

Capacitive sensing may be classified into add-on type, on-cell type, and in-cell type.

In the add-on type, as shown in FIG. 1, a display device 1 and 2 and a touch film 3 with touch sensors are separately manufactured, and the touch film 3 is attached to the surface of the display device. In FIG. 1, reference numeral 1 denotes a display panel, reference numeral 2 denotes an encapsulation substrate, and reference numeral 4 denotes a touch IC. The add-on type has the problem of low visibility caused by its large thickness and the low brightness of the display device 1 and 2 because a finished touch film 3 is mounted over the display device 1 and 2.

In the on-cell type, touch sensors are directly formed on the surface of an upper glass substrate of a display device. In case of the on-cell type, touch sensors are formed on the upper surface of a display device, with a reduction in thickness compared with the add-on type, but still a driving electrode layer and sensing electrode layer constituting the touch sensors and an insulating film for insulating these layers increase the entire thickness and the number of process steps, leading to an increase in the manufacturing cost.

In the in-cell type, touch sensors are formed inside a display device, which is attracting a lot of attention in that the touch sensors can be made thin. Known examples of the in-cell type touch sensors include mutual capacitance touch sensors and self-capacitance touch sensors. In mutual capacitance sensing, driving electrode lines and sensing electrode lines cross each other within a display panel to form touch sensors, a touch driving signal is applied to the driving electrode lines, and then touch input is sensed by detecting a change in mutual capacitance at the touch sensors through the sensing electrode lines. In self-capacitance sensing, touch electrodes and sensor lines are formed on a display panel, a touch driving signal is applied to the touch electrode through the sensor lines, and touch input is sensed by detecting a change in self-capacitance at the touch electrodes.

The in-cell type too requires signal lines (e.g., driving electrode lines, sensing electrode lines, and sensor lines) associated with touch to be added on the display panel. Moreover, the in-cell type requires an electrode patterning process because an internal electrode used for display is used as an electrode of the touch sensors to achieve a thin profile and has large parasitic capacitance due to the coupling between touch sensors and pixels. This leads to a reduction in touch sensitivity and touch recognition accuracy.

In IR (infrared) sensing, as shown in FIG. 2, a display device 1 and 2 and a touch bezel 5 with touch sensors are separately manufactured, and the display device 1 and 2 and the touch bezel 5 are joined together. In FIG. 2, reference numeral 1 denotes a display panel, reference numeral 2 denotes an encapsulation substrate, and reference numeral 4 denotes a touch IC. IR (infrared) sensing does not support multi-touch due to the low response rate and the low touch resolution.

As seen from above, the conventional touch sensor technology requires complicated elements for touch sensing to be added on a display device, which complicates the manufacturing process, increases the manufacturing cost, and lowers touch sensing capabilities.

SUMMARY

An aspect of the present invention is to provide a touch sensor integrated display device which can minimize additional elements for touch sensing and enhance touch sensing capabilities.

In one embodiment, a touch sensor integrated display device comprises: a display panel with a plurality of pixels, each pixel comprising an organic light emitting diode (OLED) and a driving thin film transistor (TFT) for applying a source-drain current (hereinafter, Ids) to the OLED; a gate drive circuit configured to generate a scan control signal and a sensing control signal and to supply the scan control signal and the sensing control signal to gate lines on the display panel; and a data drive circuit configured to set a gate-source voltage (hereinafter, Vgs) to turn on the driving TFT by applying a data voltage for touch sensing to a gate node of the driving TFT through a data line and a reference voltage to a source node of the driving TFT through a sensing line, during a reset period based on the scan control signal and the sensing control signal, and to output a sensing value by sensing a change in the Ids of the driving TFT caused by touch input, during a sensing period subsequent to the reset period; and a timing controller configured to compare the sensing value with a predetermined reference value to detect the touch input.

One or more embodiments relate to a method for driving a touch sensor integrated display device. In one embodiment, the touch sensor integrated display device comprises a display panel with a plurality of pixels, each pixel comprising an organic light emitting diode (OLED) and a driving thin film transistor (TFT) for applying a source-drain current (hereinafter, Ids) to the OLED. The method includes generating a scan control signal and a sensing control signal, and supplying the scan control signal and the sensing control signal to gate lines of the display panel. The method further includes setting a gate-source voltage (i.e., Vgs) to turn on the driving TFT by applying a data voltage for touch sensing to a gate node of the driving TFT through a data line and a reference voltage to a source node of the driving TFT through a sensing line, during a reset period based on the scan control signal and the sensing control signal, and outputting a sensing value by sensing a change in the Ids of the driving TFT caused by touch input. The method further includes comparing the sensing value with a predetermined reference value to detect the touch input.

One or more embodiments relate to a touch sensor integrated display device for sensing a user touch. In one embodiment, the touch sensor integrated display device comprises a display panel comprising a plurality of pixels, each pixel including an organic light emitting diode (OLED) and a driving transistor. The driving transistor is coupled to the OLED and a sensing device, the sensing device configured to detect whether the display panel is touched or not based on a first current flowing through the driving transistor when the OLED does not emit light during a sensing period.

In one or more embodiments, the driving transistor and the OLED are coupled in series with each other, and the OLED is configured to emit light according to a second current flowing through the driving transistor during an image display period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Hereinafter, various embodiments of a touch sensor integrated display device will be described with reference to FIGS. 3 to 31.

Figure 1:
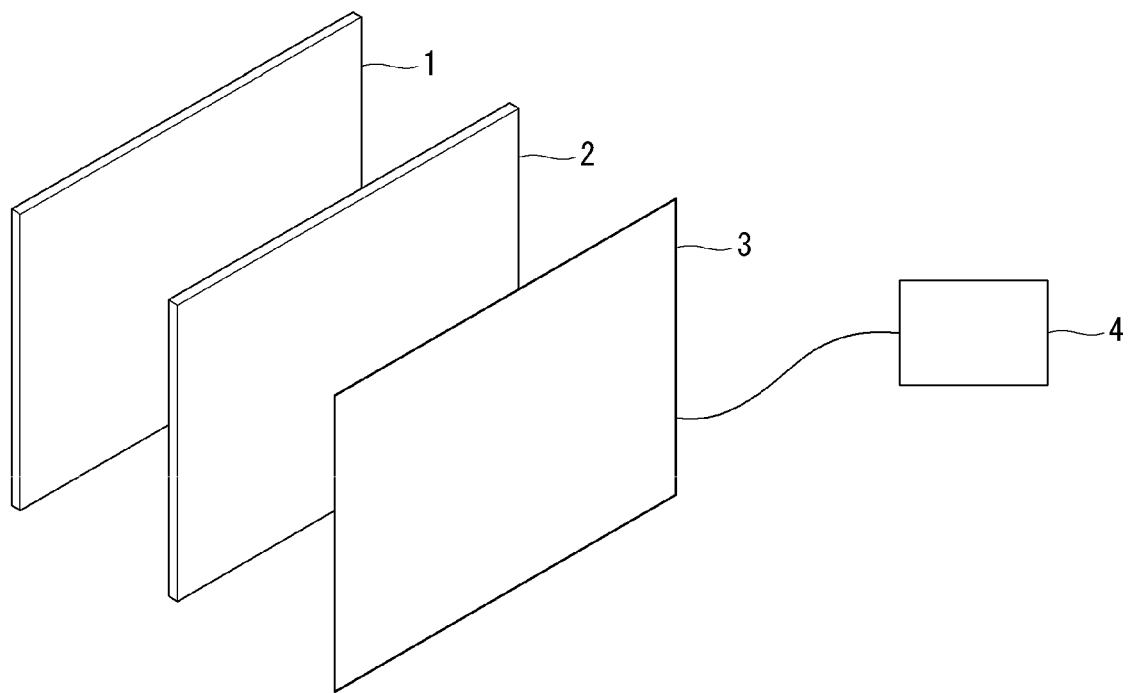
FIG. 1 is a view showing a method for implementing touch sensors by capacitive sensing according to the conventional art.
Figure 2:
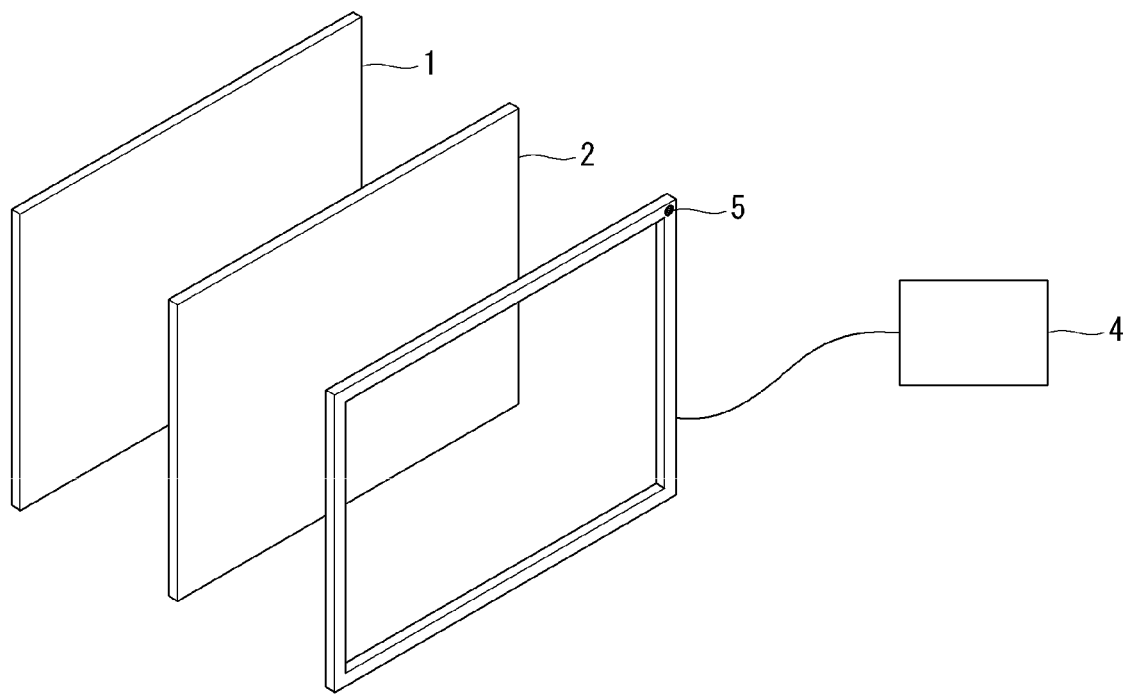
FIG. 2 is a view showing a method for implementing touch sensors by IR (Infrared) sensing according to the conventional art.
Figure 3:
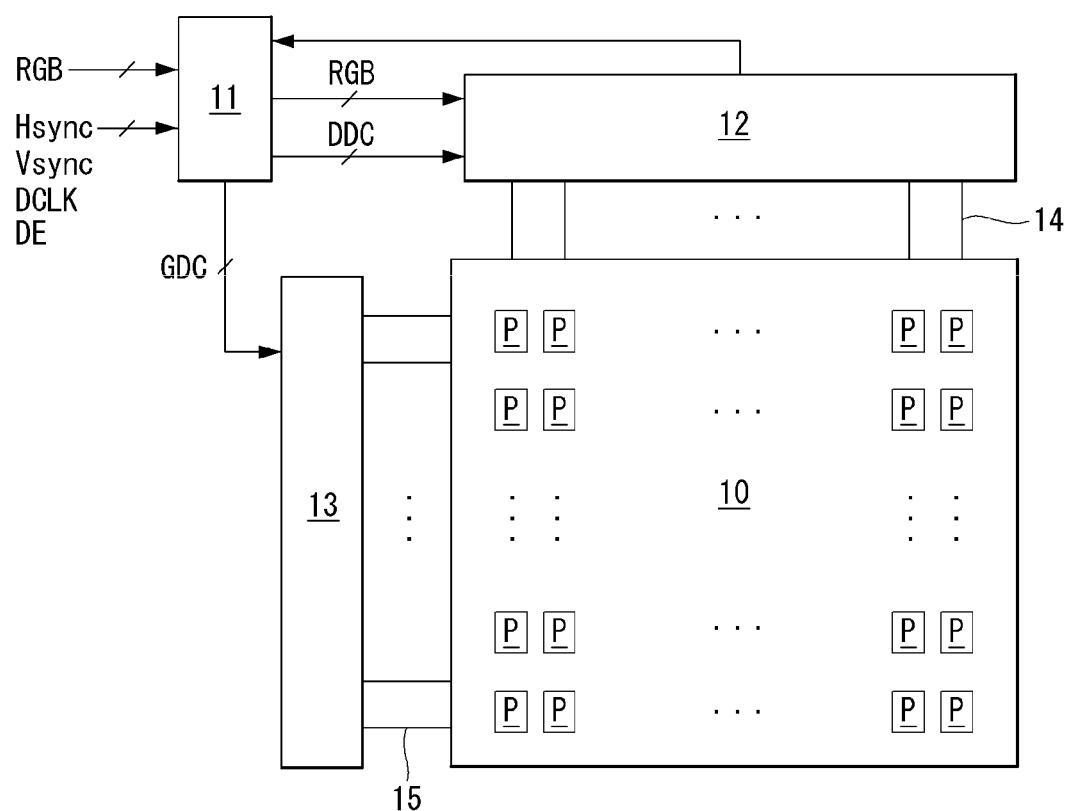
FIG. 3 is a view showing a touch sensor integrated display device according to one embodiment.
Figure 4:
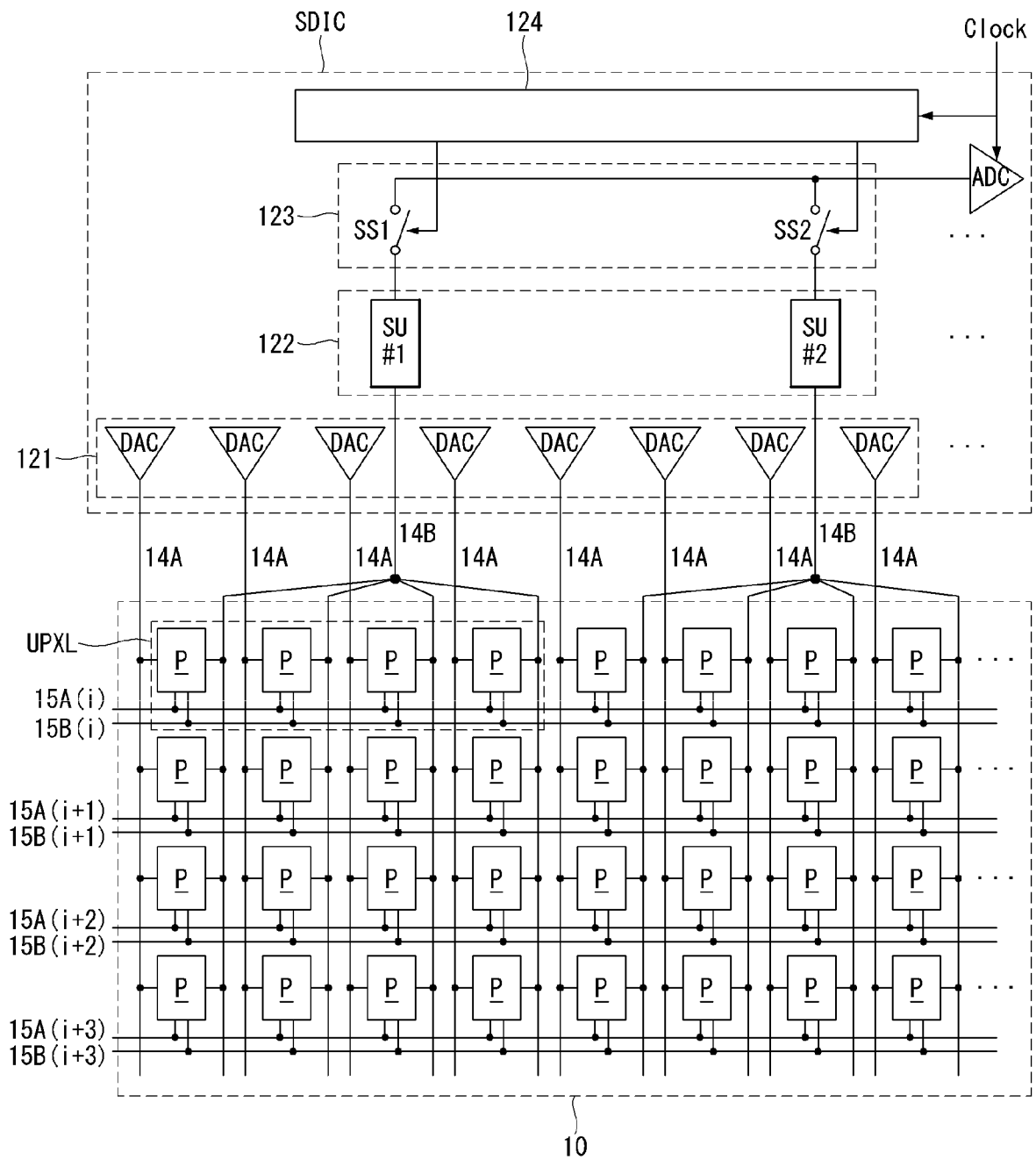
FIG. 4 is a view showing a configuration example of a pixel array comprising a plurality of pixels, which can be used as touch sensors, and a source drive IC.
Figure 5:
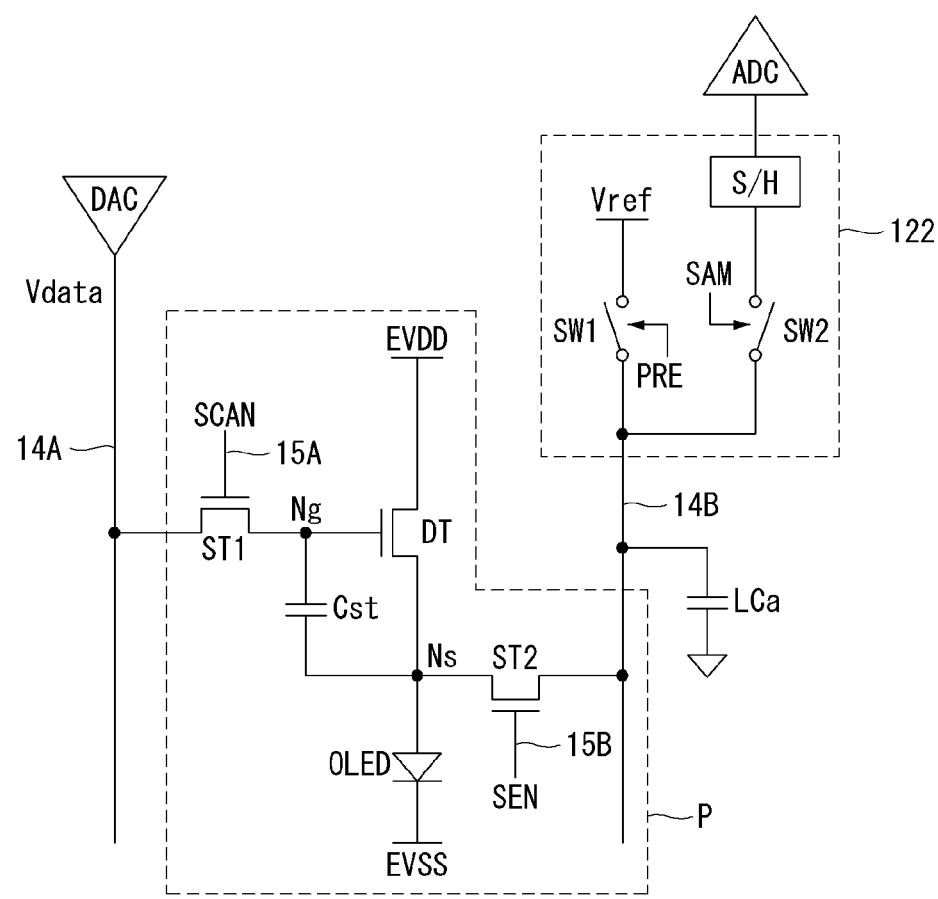
FIG. 5 is a view showing a configuration of a pixel and a configuration example of a sensing unit connected to a pixel according to one embodiment.
Figure 6:
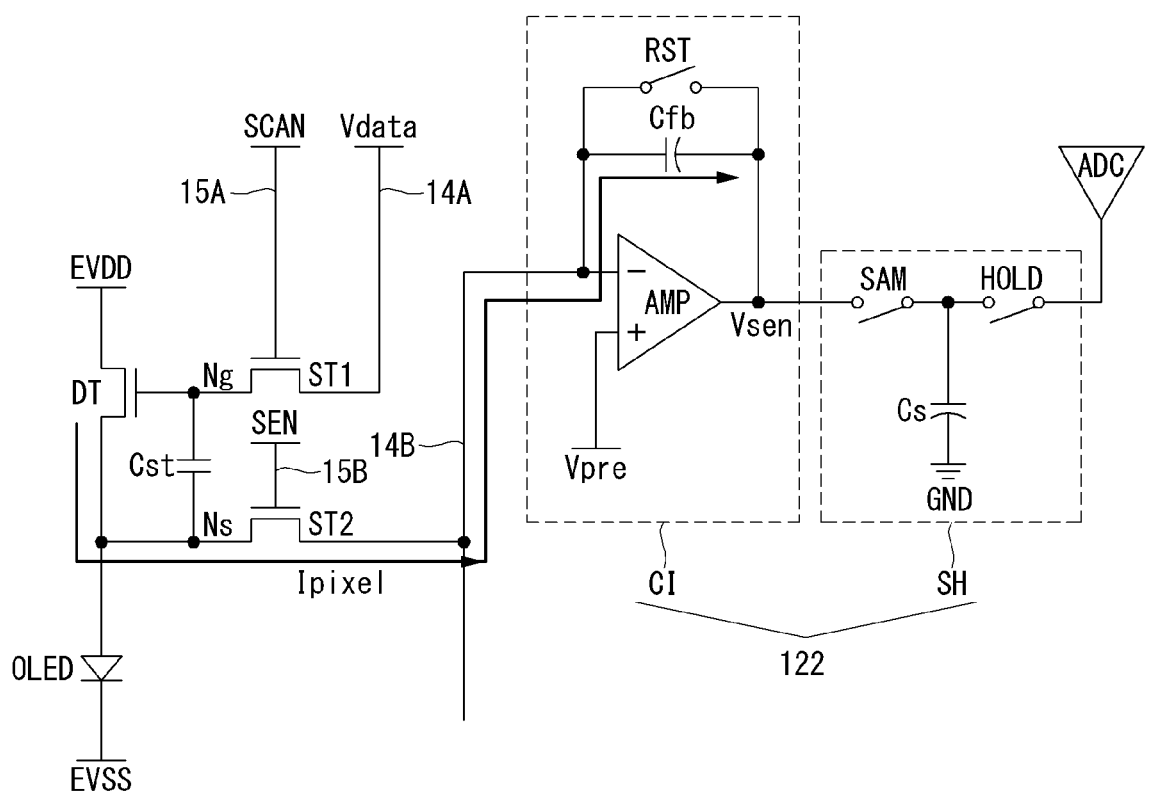
FIG. 6 is a view showing a configuration of a pixel and a configuration example of a sensing unit connected to a pixel according to another embodiment.

FIG. 3 is a view showing a touch sensor integrated display device according to one embodiment. FIG. 4 is a view showing a configuration example of a pixel array comprising a plurality of pixels, which can be used as touch sensors, and a source drive IC. FIGS. 5 and 6 are views showing the configuration of a pixel and a configuration example of a sensing unit connected to the pixel according one embodiment.

The touch sensor integrated display device is implemented as an organic light-emitting display device, especially, one comprising a pixel array for external compensation. The touch sensor integrated display device requires no touch electrodes and sensor lines and can minimize additional elements for touch sensing because it senses touch input using an external compensation-type pixel array.

External compensation is a technique of sensing electrical characteristics of organic light-emitting diodes (hereinafter, OLEDs) and driving TFTs (thin film transistors) included in pixels and correcting input video data according to sensing values. An organic light-emitting device comprising a pixel array for external compensation is disclosed in Republic of Korea Patent Application Nos. 10-2013-0134256 (filed on Nov. 6, 2013), 10-2013-0141334 (filed on Nov. 20, 2013), 10-2013-0149395 (filed on Dec. 3, 2013), 10-2014-0086901 (filed on Jul. 10, 2014), 10-2014-0079255 (filed on Jun. 26, 2014), 10-2014-0079587 (filed on Jun. 27, 2014), 10-2014-0119357 (filed on Sep. 5, 2014), etc. which are incorporated herein by reference.

Referring to FIGS. 3 to 6, a touch sensor integrated display device according to an exemplary embodiment may comprise a display panel 10, a timing controller 11, a data drive circuit 12, and a gate drive circuit 13.

A plurality of data lines and sensing lines 14A and 14B and a plurality of gate lines 15 intersect each other on the display panel 10, and pixels P capable of being compensated externally are arranged in a matrix form at the intersections to form a pixel array. The gate lines 15 comprise a plurality of first gate lines 15A to which a scan control signal SCAN is supplied, and a plurality of second gate lines 15B to which a sensing control signal SEN is supplied.

Each pixel P may be connected to one of the data lines 14A, one of the sensing lines 14B, one of the first gate lines 15A, and one of the second gate lines 15B. A plurality of pixels P included in a pixel unit UPXL may share one sensing line 14B. The pixel unit UPXL may comprise, but not be limited to, four pixels: a red pixel, a green pixel, a blue pixel, and a white pixel. Also, the pixels included in the pixel unit UPXL may be individually connected to a plurality of sensing lines, rather than sharing one sensing line. Each pixel P receives a high-potential driving voltage EVDD and a low-potential driving voltage EVSS from a power generator (not shown).

A pixel P for external compensation may comprise an OLED, a driving TFT DT, a storage capacitor Cst, a first switching TFT ST1, and a second switching TFT ST2. The TFTs may be implemented as p-type, or n-type, or a hybrid of p-type and n-type. Also, a semiconductor layer of the TFTs may comprise amorphous silicon, polysilicon, or an oxide.

The OLED comprises an anode connected to a source node Ns, a cathode connected to an input terminal of low-potential driving voltage EVSS, and an organic compound layer located between the anode and the cathode. The organic compound layer may comprise a hole injection layer HIL, a hole transport layer HTL, an emission layer EML, an electron transport layer ETL, and an electron injection layer EIL.

The driving TFT DL controls the amount of source-drain current (hereinafter, Ids) of the driving TFT DT flowing to the OLED according to a gate-source voltage (hereinafter, Vgs). The driving TFT DT has a gate electrode connected to a gate node Ng, a drain electrode connected to an input terminal of high-potential driving voltage EVDD, and a source electrode connected to a source node Ns. The storage capacitor Cst is connected between the gate node Ng and the source node Ns to maintain the Vgs of the driving TFT DT for a certain period of time. The first switching TFT ST1 switches on an electrical connection between a data line 14A and the gate node Ng in response to a scan control signal SCAN. The first switching TFT ST1 has a gate electrode connected to a first gate line 15A, a drain electrode connected to the data line 14A, and a source electrode connected to the gate node Ng. The second switching TFT ST2 switches on an electrical connection between the source node Ns and a sensing line 14B in response to a sensing control signal SEN. The second switching TFT ST2 has a gate electrode connected to a second gate line 15B, a drain electrode connected to the sensing line 14B, and a source electrode connected to the source node Ns.

A touch sensor integrated display device having such a pixel array for external compensation may operate in a first driving mode for displaying images and making external compensation or in a second driving mode for displaying images, making external compensation, and performing touch sensing.

When the touch sensor integrated display device operates in the first driving mode, external compensation is made in a vertical blanking interval during image display, or in a power-on sequence interval before the beginning of image display, or in a power-off sequence interval after the end of image display. The vertical blanking interval is the time during which image data is not written, which is arranged between vertical active periods in which one frame of image data is written. The power-on sequence interval is the time between the turn-on of driving power and the beginning of image display. The power-off sequence interval is the time between the end of image display and the turn-off of driving power.

When the touch sensor integrated display device operates in the second driving mode, touch sensing is performed in a horizontal blanking interval during image display or in a vertical blanking interval during image display. The horizontal blanking interval is the time during which no image data is written, which is arranged between horizontal active periods in which one horizontal line of image data is written. When the touch sensor integrated display device operates in the second driving mode, external compensation may be made in a vertical blanking interval, with touch sensing separately, or in the power-on sequence period, or in the power-off sequence period.

The timing controller 11 may switch between the driving modes based on information about the user's mode selection, whether touch input is present or not, and the distance between the display device and the user. The timing controller 11 may switch from the first driving mode to the second driving mode or vice versa depending on information about the user's mode selection via a remote control, a smartphone, buttons, and so on. Also, the timing controller 11 may determine whether touch input is present or not, by performing as little touch sensing as possible, without affecting the picture quality, and may switch from the first driving mode to the second driving mode when touch input is sensed or switch from the second driving mode to the first driving mode when no touch input is sensed for a certain period of time or longer. Also, the timing controller 11 may determine the distance between the display device and the user based on information input from a camera, infrared sensor, etc., and may switch from the first driving mode to the second driving mode if the user comes within a given distance or switch from the second driving mode to the first driving mode if the user moves the given distance away.

The timing controller 11 generates a data control signal DDC for controlling the operation timing of the data drive circuit 12 and a gate control signal GDC for controlling the operation timing of the gate drive circuit 13, based on timing signals such as a vertical synchronization signal Vsync, a horizontal synchronization signal Syncs, a dot clock signal DCLK, and a data enable signal DE. In the first driving mode, the timing controller 11 may temporally separate an image display period and an external compensation period and generate the control signals DDC and GDC differently for image display and external compensation, respectively. In the second driving mode, the timing controller 11 may temporally separate an image display period and an external compensation period and generate the control signals DDC and GDC differently for image display, external compensation, and touch sensing, respectively.

The timing controller 11 may adjust the frequencies of the gate control signal GDC and the data control signal DDC with respect to a frame frequency of k/i Hz so that digital video data received at a frame frequency of k Hz is written in the pixel array of the display panel 10 at a frequency of k/i (k and i are positive integers), in order to secure a sensing period for external compensation and/or a touch sensing period.

The gate control signal GDC comprises a gate start pulse GSP, a gate shift clock GSC, and a gate output enable signal GOE. The gate start pulse GSP is applied to a gate stage for generating a first scan signal and controls the gate stage to generate the first scan signal. The gate shift clock GSC is a clock signal that is commonly input into gate stages and shifts the gate start pulse GSP. The gate output enable signal GOE is a masking signal that controls the output of the gate stages.

The data control signal DDC comprises a source start pulse SSP, a source sampling clock SSC, and a source output enable signal SOE. The source start pulse SSP controls the timing of the start of data sampling of the data drive circuit 12. The source sampling clock SSC is a clock signal that controls the timing of data sampling in each source drive IC based on a rising or falling edge. The source output enable signal SOE controls the output timing of the data drive circuit 12. The data control signal DDC comprises a reference voltage control signal PRE and sampling control signal SAM for controlling the operation of a sensing unit 122 included in the data drive circuit 12. The reference voltage control signal PRE controls the timing for applying a reference voltage to the sensing lines 14B. The sampling control signal SAM controls the timing for sampling a sensing value resulting from external compensation or a sensing value resulting from touch sensing.

The timing controller 11 may store the sensing value resulting from external compensation in a memory (not shown) and then compensate digital video data RGB based on the sensing value to compensate for differences in the electrical characteristics of the driving TFTs between the pixels or differences in OLED degradation between the pixels. The timing controller 11 may compare the sensing value resulting from touch sensing with a predetermined reference value and obtain the coordinates of the touch input position.

The timing controller 11, while operating for image display, may transmit digital video data RGB input from an external video source to the data drive circuit 12. The timing controller 11, while operating for external compensation, may transmit a certain level of digital data for external compensation to the data drive circuit 12. The timing controller 11, while operating for touch sensing, may transmit a certain level of digital data for touch sensing to the data drive circuit 12.

The data drive circuit 12 comprises at least one source drive IC (Integrated circuit) SDIC. The source drive IC SDIC may comprise a latch array (not shown), a plurality of digital-to-analog converters (hereinafter, DACs) 121 connected to each data line 14A, a plurality of sensing units 122 connected to the sensing lines 14B, a MUX 123 for selectively connecting the sensing units 122 to the analog-to-digital converter (hereinafter, ADC), and a shift register 124 for generating a selection control signal and sequentially turning on switches SS1 and SS2 in the MUX 123.

The latch array latches various kinds of digital data input from the timing controller 11 and supplies it to the DAC based on the data control signal DDC. For image display, the DAC may convert digital video data RGB input from the timing controller 11 to a data voltage for image display and supply it to the data lines 14A. In an external compensation operation, the DAC may convert digital data for external compensation input from the timing controller 11 to a data voltage for external compensation and supply it to the data lines 14A. In a touch sensing operation, the DAC may convert digital data for touch sensing input from the timing controller 11 to a data voltage for touch sensing and supply it to the data lines 14A.

The sensing units 122 may supply a reference voltage Vref to the sensing lines 14B based on the data control signal DDC, or may sample a sensing value input through the sensing lines 14B and supply it to the ADC. This sensing value may be one for external compensation or one for touch sensing.

The sensing units 122 may be implemented as voltage sensing-type shown in FIG. 5 or current sensing-type shown in FIG. 6.

The voltage sensing-type sensing unit 122 of FIG. 5 senses a voltage stored in a line capacitors LCa of a sensing line 14B according to the Ids of a driving TFT DT, and may comprise a reference voltage control switch SW1, a sampling switch SW2, and a sample and hold portion S/H. The reference voltage control switch SW1 switches on an electrical connection between an input terminal of reference voltage Vref and the sensing line 14B, in response to a reference voltage control signal PRE. The sampling switch SW2 switches on an electrical connection between the sensing line 14B and the sample and hold portion S/H in response to a sampling control signal SAM. If the source node voltage of the driving TFT DT changes according to the Ids of the driving TFT DT, the sample and hold portion S/H samples and holds the source node voltage of the driving TFT DT stored in the line capacitor LCa of the sensing line 14B as a sensed voltage when the sampling switch SW2 is turned on, and then transmits it to the ADC.

The current sensing-type sensing unit 122 of FIG. 6 directly senses the Ids of the driving TFT transmitted through the sensing line 14B, and may comprise a current integrator CI and a sample and hold portion SH. The current integrator CI integrates current data input through the sensing line 14B and generates a sensing value Vsen. The current integrator CI comprises an amplifier AMP comprising an inverting input terminal (−) for receiving the Ids of the driving TFT from the sensing line 14B, a non-inverting input terminal (+) for receiving an amplifier reference voltage Vpre, and an output terminal, an integrating capacitor Cfb connected between the inverting input terminal (−) and output terminal of the amplifier AMP, and a reset switch RST connected to both ends of the integrating capacitor Cfb.

The current integrator CI is connected to the ADC through the sample and hold portion SH. The sample and hold portion SH may comprise a sampling switch SAM for sampling a sensing value Vsen output from the amplifier AMP and storing it in a sampling capacitor Cs, and a holding switch HOLD for transmitting the sensing value Vsen stored in the sampling capacitor Cs to the ADC.

The gate drive circuit 13 generates a scan control signal SCAN for image display, external compensation, or touch sensing based on the gate control signal GDC, and then supplies it to the first gate lines 15A. The gate drive circuit 13 generates a sensing control signal SEN for image display, external compensation, or touch sensing based on the gate control signal GDC, and then supplies it to the second gate lines 15B.

The principle of sensing touch input in the touch sensor integrated display device will be briefly described. When a finger or conductive object (hereinafter, collectively referred to as a finger) touches the surface of the display device, with the Vgs of the driving TFT set in advance, the Vgs of the driving TFT changes due to a touch capacitor between the finger and the driving TFT. As the change in the Vgs of the driving TFT leads to a change in the Ids of the driving TFT, a touch can be detected based on the difference in the Ids of the driving TFT between pixels touched with the finger and the other pixels. The Ids is proportional to the square of a difference between Vgs and a threshold voltage of the driving TFT. Thus, the Ids is sensed as an amplified current even if the amount of Vgs change caused by touch input is small, which offers an advantage to enhancing sensing capabilities.

Hereinafter, a concrete driving method for touch sensing under the second driving mode will be described in detail.

Figure 7:
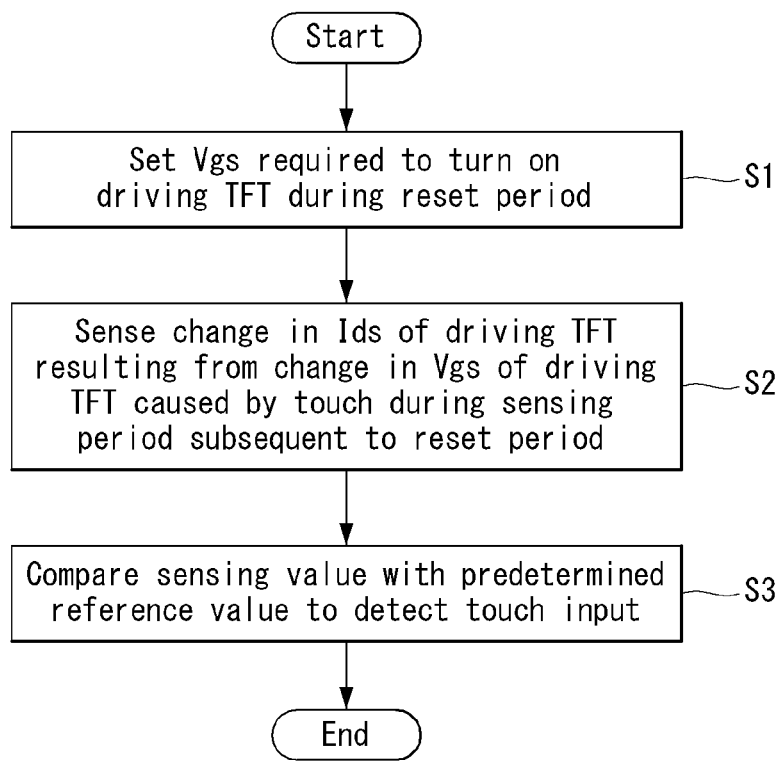
FIG. 7 shows a method of driving a touch sensor integrated display device according to one embodiment.

FIG. 7 shows a method of driving a touch sensor integrated display device according to an exemplary embodiment.

Referring to FIG. 7, a reset period and a sensing period are set based on a scan control signal and sensing control signal that are applied to the gate lines 15A and 15B of the display panel 10 and a reference voltage control signal PRE that controls an electrical connection between the sensing lines 14B and the input terminal of reference voltage Vref (S1).

In one embodiment, during the reset period, a Vgs required to turn on the driving TFT DT is set by applying a data voltage for touch sensing to the gate node Ng of the driving TFT DT through the data line 14A and a reference voltage to the source node Ns of the driving TFT DT through the sensing line 14B (S1). Next, during the sensing period subsequent to the reset period, a sensing value is output by sensing a change in the Ids of the driving TFT DT caused by touch input (S2).

The sensing value is compared with a predetermined reference value to detect touch input (S3).

[First Sensing Approach for Sensing Change in Vgs of Driving TFT]

Figure 8:
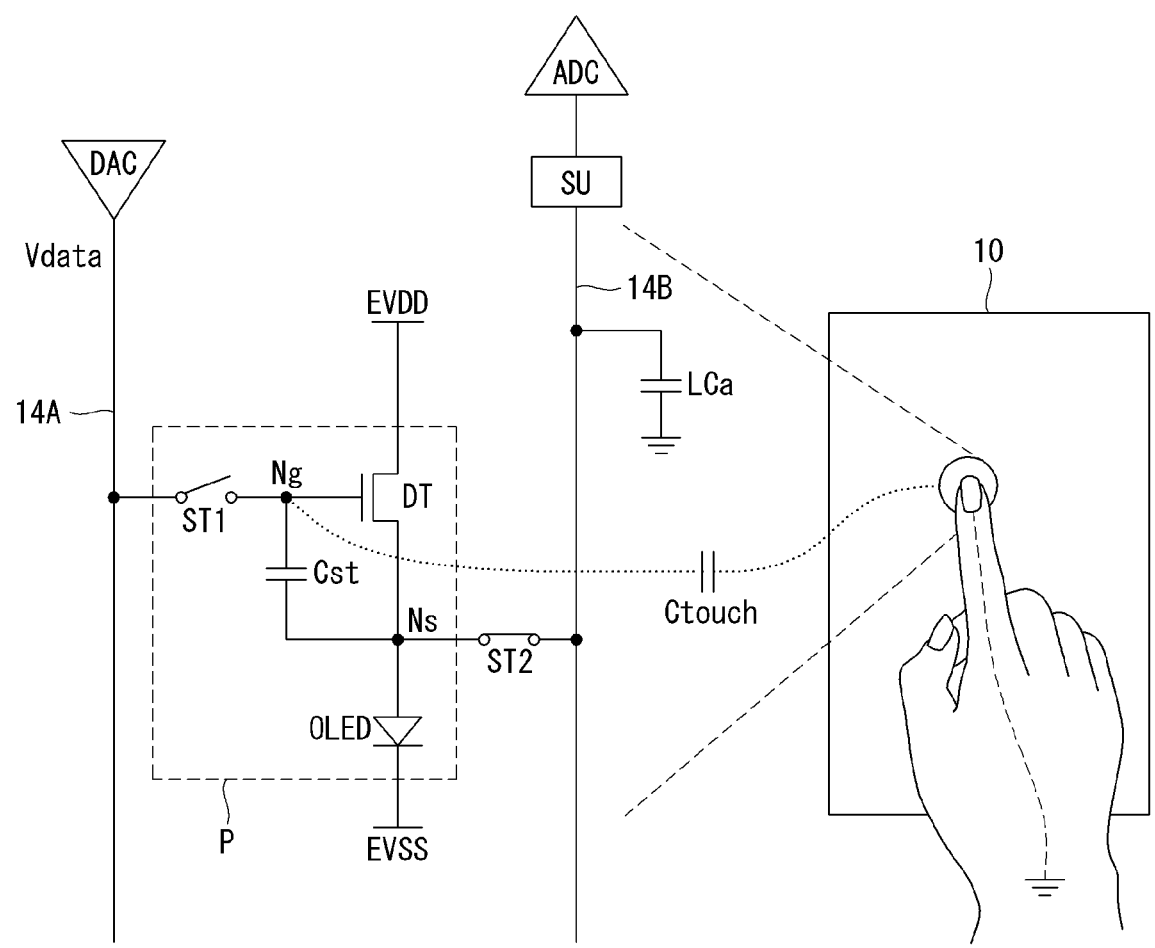
FIG. 8 shows a first sensing approach for sensing a change in a gate source voltage (Vgs) of a driving TFT caused by touch input when a touch capacitor is connected to the gate node of the driving TFT.
Figure 9:
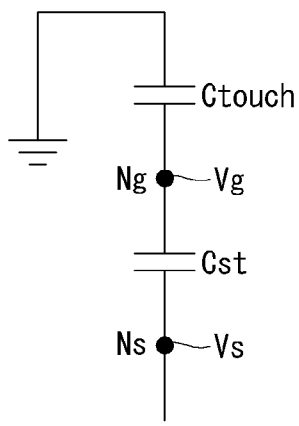
FIG. 9 shows a circuit diagram of a capacitor network for performing touch sensing according to the first sensing approach.

FIGS. 8 and 9 show a first sensing approach for sensing a change in the Vgs of a driving TFT caused by touch input when a touch capacitor is connected to the gate node of the driving TFT.

Referring to FIGS. 8 and 9, when a finger touches the surface of the display device after the Vgs of the driving TFT DT is set in the storage capacitor Cst in the reset period, a touch capacitor Ctouch between the finger and the driving TFT DT is connected to the gate node Ng of the driving TFT DT. The touch capacitor Ctouch connected to the gate node Ng is a finger capacitor between the gate electrode of the driving TFT DT and the finger. As the area contacted by the finger is larger than the area occupied by one pixel, the touch capacitor Ctouch between the finger and the driving TFT DT may be connected to the source node Ns of the driving TFT DT as well. The touch capacitor Ctouch connected to the source node Ns is a finger capacitor between the source electrode of the driving TFT DT and the finger. As the finger capacitor between the source electrode of the driving TFT DT and the finger is smaller than the line capacitor LCa of the sensing line 14B, it has a very small effect on the change in the Vgs of the driving TFT. This is because, in the first sensing approach, the touch capacitor Ctouch induces the change in the Vgs of the driving TFT while the gate node Ng is floating and the source node Ns is connected to the sensing line 14B. Accordingly, in the first sensing approach, it is deemed that there is no finger capacitor between the source electrode of the driving TFT DT and the finger.

When the touch capacitor Ctouch is connected to the gate node Ng while the gate node Ng is floating, the Vgs of the driving TFT DT changes and the Ids of the driving TFT DT therefore changes. By changing the reference voltage applied to the source node Ns when the touch capacitor Ctouch is connected to the gate node Ng while the gate node Ng is floating, the Vgs of the driving TFT DT can be rapidly changed, and the Ids of the driving TFT DT can be therefore rapidly changed.

Figure 10:
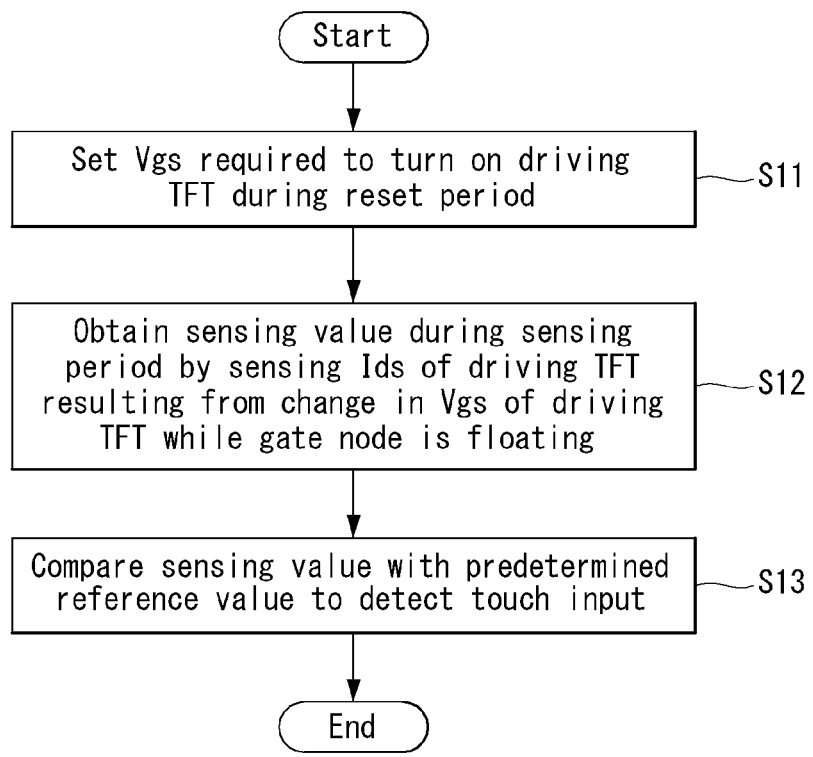
FIG. 10 shows a method of sensing a change in the Vgs of a driving TFT caused by touch input, according to one embodiment of the first sensing approach.
Figure 11:
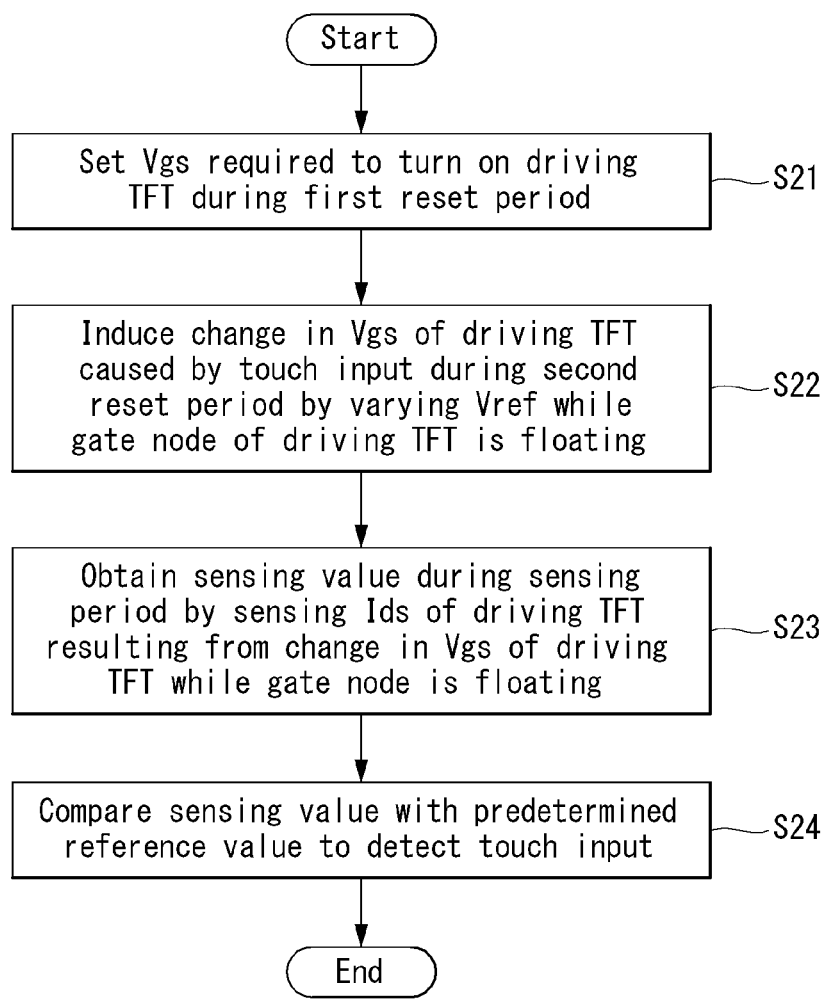
FIG. 11 shows a method of sensing a change in the Vgs of a driving TFT caused by touch input, according to another embodiment of the first sensing approach.

FIGS. 10 and 11 show concrete driving methods for implementing the first sensing approach of FIGS. 8 and 9.

Referring to FIG. 10, in one driving method for implementing the first sensing approach, during the reset period, a Vgs required to turn on the driving TFT DT is set by applying a data voltage for touch sensing to the gate node Ng of the driving TFT DT through the data line 14A and a reference voltage to the source node Ns of the driving TFT DT through the sensing line 14B (S11).

In one driving method, during the sensing period subsequent to the reset period, a sensing value Vsen is obtained by sensing the Ids of the driving TFT DT resulting from change in the Vgs of the driving TFT DT while the gate node Ng is floating (S12). The Ids of the driving TFT DT at a touched area connected to the touch capacitor Ctouch is lower than Ids of a driving TFT DT at an untouched area, and this leads to a decrease in sensing value Vsen.

More concretely, an Ids flows through the driving TFT DT by the Vgs of the driving TFT DT, which is set in the reset period, and the potential Vs of the source node Ns rises by ΔVs due to the Ids. In this case, if the touch capacitor Ctouch is connected to the floating gate node Ng (that is, there is no touch input), the potential of the gate node Ng rises by ΔVs. Thus, there is no change in the Vgs of the driving TFT DT, and the static current mode is maintained. In contrast, if the touch capacitor Ctouch is connected to the floating gate node Ng (that is, there is touch input), the potential of the gate node Ng rises by ΔVs', which is smaller than ΔVs, due to voltage division between the storage capacitor Cst and the touch capacitor Ctouch. Thus, the Vgs of the driving TFT DT decreases compared to the initial one, and as a result, the Ids of the driving TFT DT also decreases.

$$Vgs' = Vgs - (\Delta Vs - \Delta Vs') \qquad \text{[Equation 1]}$$

$$\Delta Vs' = \Delta Vs \times \frac{CST}{(CST = CTOUCH)}$$

That is, the gate-source voltage of the driving TFT DT for the touched area is the Vgs' of Equation 1. Accordingly, the Ids of the driving TFT DT for the touched area is lower than Ids of a driving TFT DT for the untouched area according to the expression of TFT current (Ids=K(Vgs−Vth)$^2$). By sensing this change in the Ids of the driving TFT DT, touch input can be detected. In Equation 1, CST denotes the capacitance of the storage capacitor Cst, and CTOUCH denotes the capacitance of the touch capacitor Ctouch.

In one driving method, touch input is detected by comparing the sensing value Vsen with a stored reference value (S13). As used herein, the reference value is determined based on the Vgs set during the reset period. If the difference between the sensing value Vsen of a pixel and the reference value is smaller than or equal to a threshold, the corresponding position associated with the pixel may be detected as the untouched area, or if the difference between the sensing value Vsen of a pixel and the reference value is greater than the threshold, the corresponding position associated with the pixel may be detected as the touched area.

FIG. 11 shows another driving method for implementing the first sensing approach. The reset period is divided into a first reset period in which the gate node Ng of the driving TFT DT is connected to the data line 14A, and a second reset period in which the gate node Ng of the driving TFT DT is floating.

In another driving method, during the first reset period, a Vgs required to turn on the driving TFT DT is set by applying a data voltage for touch sensing to the gate node Ng of the driving TFT DT through the data line 14A and a reference voltage to the source node Ns of the driving TFT DT through the sensing line 14B (S21).

In another driving method, during the second reset period subsequent to the first reset period, a rapid change in the Vgs of the driving TFT DT is induced by varying (decreasing or increasing) the reference voltage while the gate node Ng of the driving TFT DT is floating (S22). For example, in another driving method, during the second reset period, the reference voltage applied to the source node Ns may decrease by ΔVs while the gate node Ng of the driving TFT DT is floating. In this case, if the touch capacitor Ctouch is not connected to the floating gate node Ng (that is, there is no touch input), the potential of the gate node Ng falls by ΔVs. Thus, there is no change in the Vgs of the driving TFT DT, and the static current mode is maintained. In contrast, if the touch capacitor Ctouch is connected to the floating gate node Ng (that is, there is touch input), the potential of the gate node Ng falls by ΔVs', which is smaller than ΔVs, due to voltage division between the storage capacitor Cst and the touch capacitor Ctouch. Thus, the Vgs of the driving TFT DT increases compared to the initial one, and as a result, the Ids of the driving TFT DT also increases. By inducing a rapid change in the Vgs of the driving TFT DT, the time needed for sensing can be reduced.

In another driving method, during the sensing period subsequent to the second reset period, a sensing value Vsen is obtained by sensing the Ids of the driving TFT DT resulting from the change in the Vgs of the driving TFT DT while the gate node Ng is floating (S23). The Ids of the driving TFT DT at a touched area connected to the touch capacitor Ctouch is different from Ids of a driving TFT DT at an untouched area, and this leads to a difference in sensing value Vsen. By sensing this change in the Ids of the driving TFT DT, touch input can be detected.

In another driving method, touch input is detected by comparing the sensing value Vsen with a stored reference value (S24). As used herein, the reference value is determined based on the Vgs set during the first reset period. If the difference between the sensing value Vsen of a pixel and the reference value is smaller than or equal to a threshold, the corresponding position associated with the pixel may be detected as the untouched area, or if the difference between the sensing value Vsen of a pixel and the reference value is greater than the threshold, the corresponding position associated with the pixel may be detected as the touched area.

[Second Sensing Approach for Sensing Change in Vgs of Driving TFT]

Figure 12:
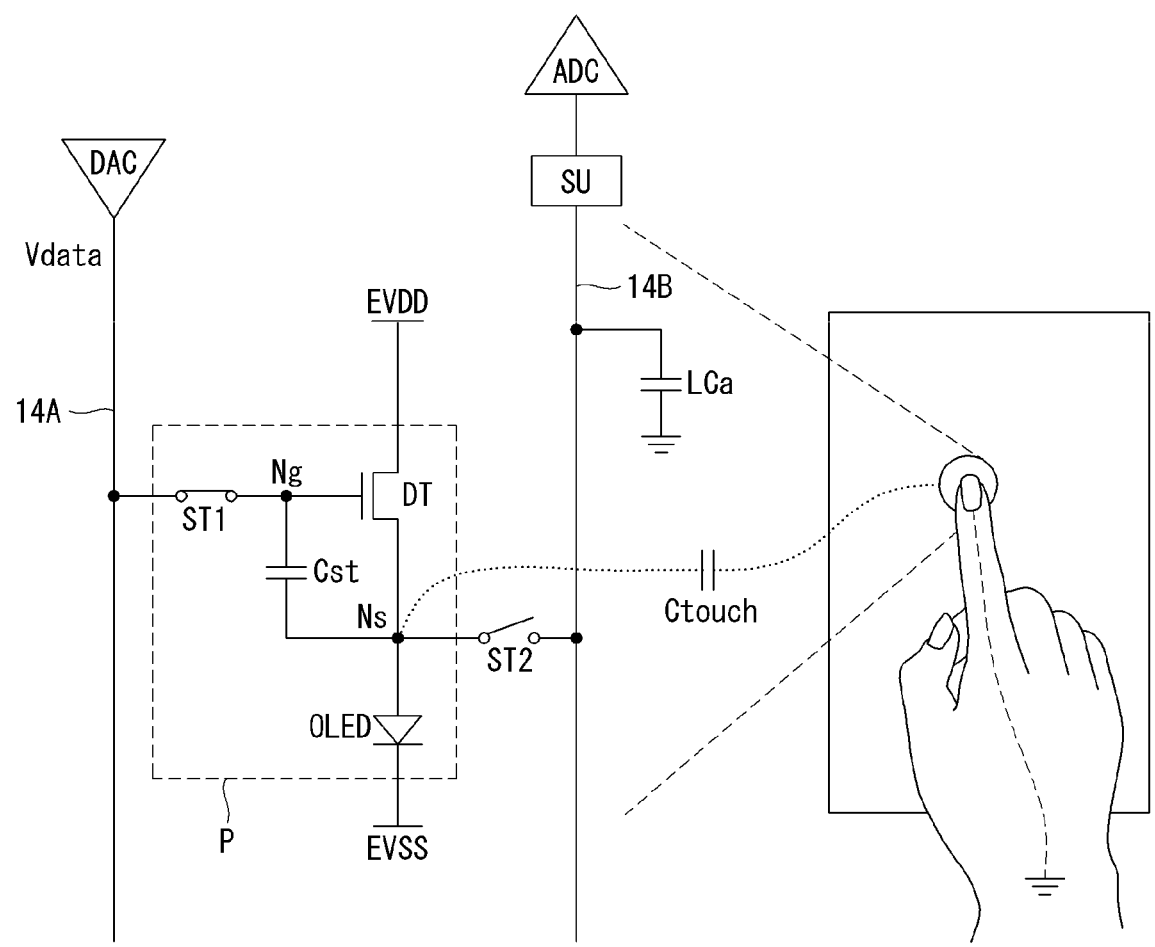
FIG. 12 shows a second sensing approach for sensing a change in the Vgs of a driving TFT caused by touch input when a touch capacitor is connected to the gate node of the driving TFT.
Figure 13:
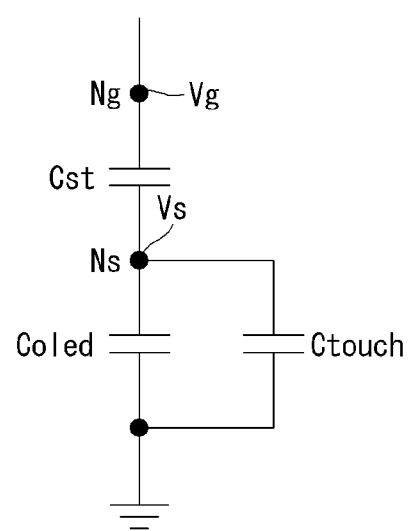
FIG. 13 shows a circuit diagram of a capacitor network for performing touch sensing according to the second approach.

FIGS. 12 and 13 show a second sensing approach for sensing a change in the Vgs of a driving TFT caused by touch input when a touch capacitor is connected to the gate node of the driving TFT.

Referring to FIGS. 12 and 13, when a finger touches the surface of the display device after the Vgs of the driving TFT DT is set in the storage capacitor Cst in the reset period, a touch capacitor Ctouch between the finger and the driving TFT DT is connected to the source node Ns of the driving TFT DT. The touch capacitor Ctouch connected to the source node Ns is a finger capacitor between the source node of the driving TFT DT and the finger. As the area contacted by the finger is larger than the area occupied by one pixel, the touch capacitor Ctouch between the finger and the driving TFT DT may be connected to the gate node Ng of the driving TFT DT as well. The touch capacitor Ctouch connected to the gate node Ng is a finger capacitor between the gate electrode of the driving TFT DT and the finger. The finger capacitor between the gate electrode of the driving TFT DT and the finger has no effect on the potential of the gate node Ng. This is because, in the second sensing approach, the touch capacitor Ctouch induces the change in the Vgs of the driving TFT while the potential of the gate node Ng is fixed and the source node Ns is floating. Accordingly, in the second sensing approach, it is deemed that there is no finger capacitor between the gate electrode of the driving TFT DT and the finger.

When the touch capacitor Ctouch is connected to the source node Ns while the source node Ns is floating, the Vgs of the driving TFT DT changes, thus the Ids of the driving TFT DT changes accordingly. By changing the data voltage for touch sensing applied to the gate node Ng when the touch capacitor Ctouch is connected to the source node Ns while the source node Ns is floating, the Vgs of the driving TFT DT can be rapidly changed, and the Ids of the driving TFT DT can be therefore rapidly changed.

Figure 14:
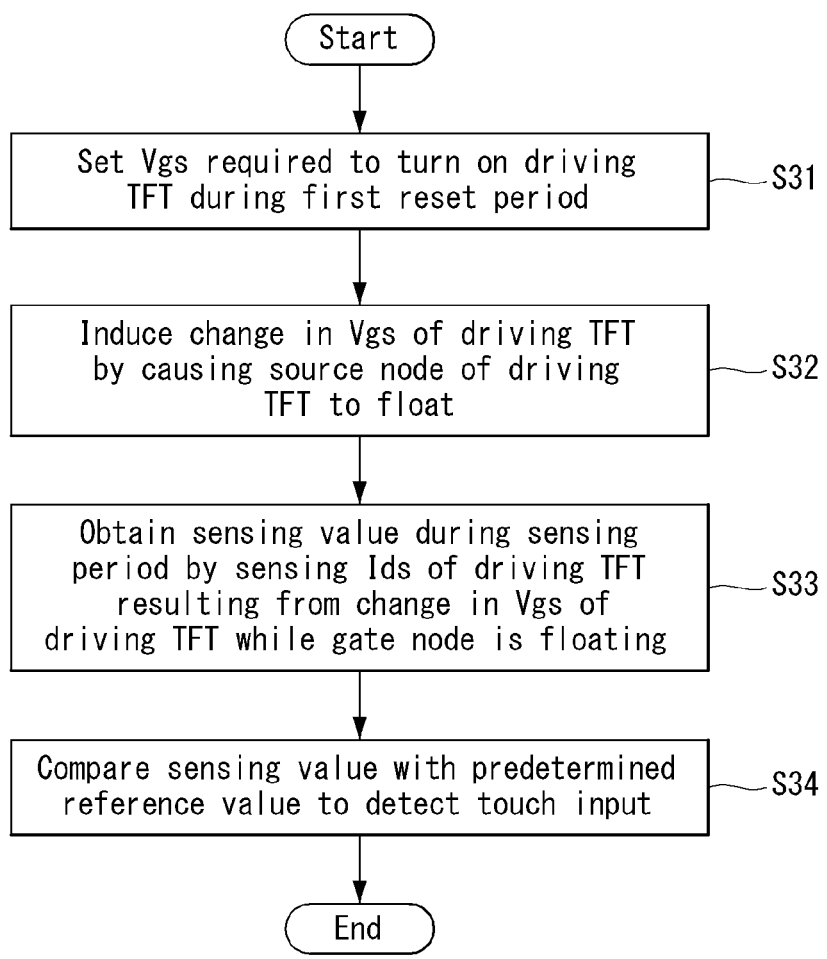
FIG. 14 shows a method of sensing a change in the Vgs of a driving TFT caused by touch input, according to one embodiment of the second sensing approach.
Figure 15:
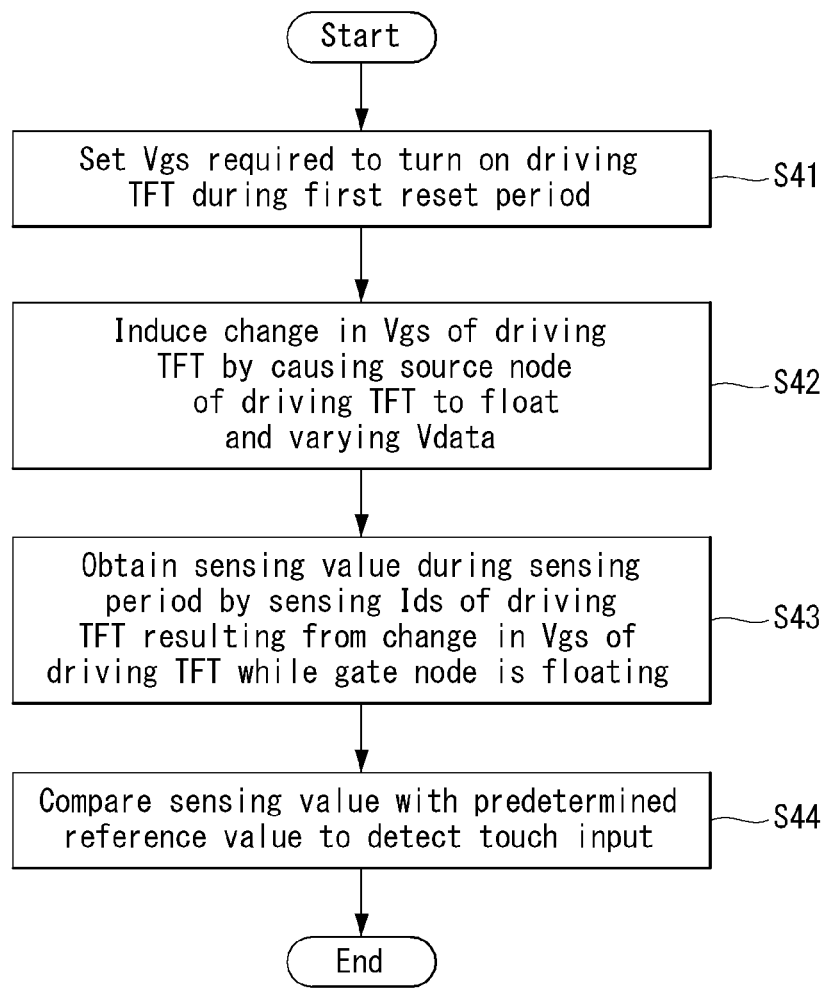
FIG. 15 shows a method of sensing a change in the Vgs of a driving TFT caused by touch input, according to another embodiment of the second sensing approach.

FIGS. 14 and 15 show concrete driving methods for implementing the second sensing approach for sensing a change in the Vgs of a driving TFT caused by touch input.

Referring to FIG. 14, in one driving method for implementing the second sensing approach, the reset period is divided into a first reset period in which the source node Ns of the driving TFT DT is connected to the input terminal of reference voltage, and a second reset period in which the source node Ns of the driving TFT DT is floating.

In one driving method, during the first reset period, a Vgs required to turn on the driving TFT DT is set by applying a data voltage for touch sensing to the gate node Ng of the driving TFT DT through the data line 14A and a reference voltage to the source node Ns of the driving TFT DT through the sensing line 14B (S31).

In one driving method, during the second reset period subsequent to the first reset period, a rapid change in the Vgs of the driving TFT DT is induced by causing the source node Ns of the driving TFT DT to float and operating the driving TFT DT as a source follower type (S32).

In one driving method, during the sensing period subsequent to the reset period, a sensing value Vsen is obtained by sensing the Ids of the driving TFT DT resulting from the change in the Vgs of the driving TFT DT while the gate node Ng is floating (S33). The Ids of the driving TFT DT at a touched area connected to the touch capacitor Ctouch is higher than Ids of a driving TFT DT at an untouched area, and this leads to an increase in sensing value Vsen.

More concretely, an Ids flows through the driving TFT DT by the Vgs of the driving TFT DT, which is set in the first reset period, the potential Vs of the source node Ns rises in the second reset period due to the Ids, and the potential Vg of the gate node Ng is fixed at the data voltage for touch driving in the second reset period. In this case, the amount of increase in the potential Vs of the source node Ns differs depending on whether the touch capacitor Ctouch is connected to the floating source node Ns (that is, there is touch input) or not (that is, there is no touch input). Due to voltage division between a parasitic capacitor Coled at two ends of the OLED and the touch capacitor Ctouch, the amount $\Delta Vs$ of increase in the potential Vs of the source node Ns observed when there is touch input is expressed by Equation 2:

$$Vgs' = Vgs - \Delta Vs \quad \text{[Equation 2]}$$
$$\Delta Vs = \frac{Ids \times \Delta t}{(COLED + CTOUCH)}$$

On the contrary, the amount $\Delta Vs$ of increase in the potential Vs of the source node Ns observed when there is no touch input is not affected by the touch capacitor Ctouch, and therefore the amount $\Delta Vs$ without the touch capacitor Ctouch becomes Ids*$\Delta t$/COLED, which is greater than that observed when there is touch input. That is, when the touch capacitor Ctouch is connected to the floating source node Ns, the potential Vs of the source node Ns rises by a smaller amount than that observed when the touch capacitor Ctouch is not connected to the floating source node Ns. Thus, the Vgs of the driving TFT DT increases relatively, and as a result, the Ids of the driving TFT DT also increases. In Equation 2, COLED denotes the capacitance of the OLED capacitor Coled, and CTOUCH denotes the capacitance of the touch capacitor Ctouch.

In one driving method, touch input is detected by comparing the sensing value Vsen with a stored reference value (S34). As used herein, the reference value is determined based on the Vgs set during the reset period. If the difference between the sensing value Vsen of a pixel and the reference value is smaller than or equal to a threshold, the corresponding position associated with the pixel may be detected as the untouched area, or if the difference between the sensing value Vsen of a pixel and the reference value is greater than the threshold, the corresponding position associated with the pixel may be detected as the touched area.

FIG. 15 shows another driving method for implementing the second sensing approach. The reset period is divided into a first reset period in which the source node Ns of the driving TFT DT is connected to the input terminal of reference voltage, and a second reset period in which the source node Ns of the driving TFT DT is floating.

In another driving method, during the first reset period, a Vgs required to turn on the driving TFT DT is set by applying a data voltage for touch sensing to the gate node Ng of the driving TFT DT through the data line 14A and a reference voltage to the source node Ns of the driving TFT DT through the sensing line 14B (S41).

In another driving method, during the second reset period subsequent to the first reset period, a rapid change in the Vgs of the driving TFT DT is induced by causing the source node Ns of the driving TFT DT to float, operating the driving TFT DT as a source follower type, and varying (decreasing or increasing) the data voltage for touch sensing (S42). For example, in another driving method, during the second reset period, the data voltage for touch sensing applied to the gate node Ng may decrease by $\Delta Vg$ while the source node Ns of the driving TFT DT is floating. In this case, if the touch capacitor Ctouch is not connected to the floating source node Ns (that is, there is no touch input), the potential of the source node Ns falls by $\Delta Vg$ and gradually rises according to the source follower method. In contrast, if the touch capacitor Ctouch is connected to the floating source node Ns (that is, there is touch input), the potential of the source node Ns falls by $\Delta Vg'$, which is smaller than $\Delta Vg$, due to voltage division between the parasitic capacitor Coled at two ends of the OLED and the touch capacitor Ctouch. Thus, the Vgs of the driving TFT DT decreases according to the touch capacitor Ctouch, and as a result, the Ids of the driving TFT DT also decreases accordingly. By inducing a rapid change in the Vgs of the driving TFT DT, the time needed for sensing can be reduced.

In another driving method, during the sensing period subsequent to the second reset period, a sensing value Vsen is obtained by sensing the Ids of the driving TFT DT resulting from the change in the Vgs of the driving TFT DT while the gate node Ng is floating (S43). The Ids of the driving TFT DT at a touched area connected to the touch capacitor Ctouch is different from Ids of a driving TFT DT at an untouched area, and this leads to a difference in sensing value Vsen. By sensing this change in the Ids of the driving TFT DT, touch input can be detected.

In another driving method, touch input is detected by comparing the sensing value Vsen with a stored reference value (S44). As used herein, the reference value is determined based on the Vgs set during the first reset period. If the difference between the sensing value Vsen of a pixel and the reference value is smaller than or equal to a threshold, the corresponding position associated with the pixel may be detected as the untouched area, or if the difference between the sensing value Vsen of a pixel and the reference value is greater than the threshold, the corresponding position associated with the pixel may be detected as the touched area.

[First Driving Example for Implementing First Sensing Approach]

Figure 16:
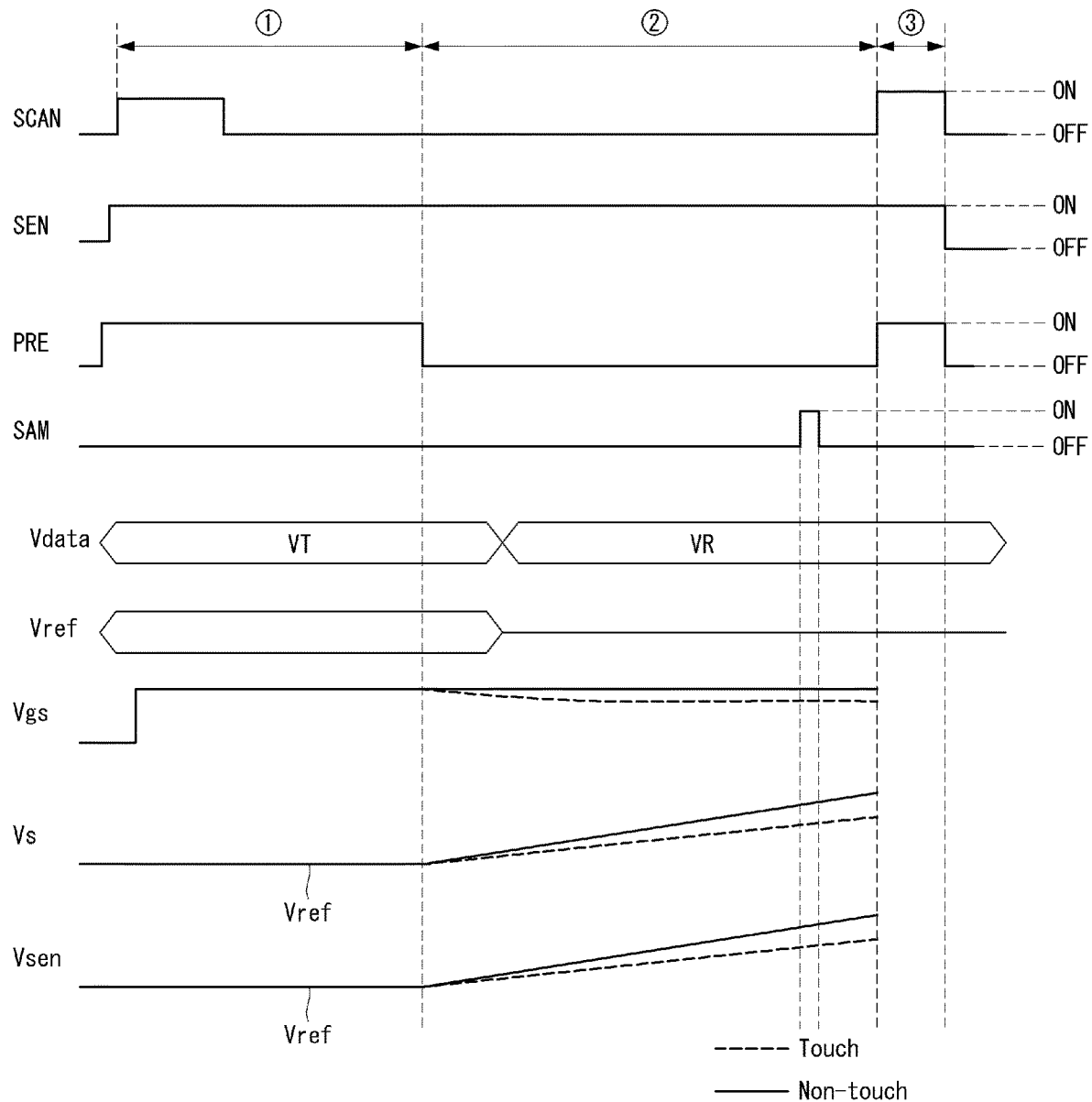
FIG. 16 shows signal waveforms according to the driving method of FIG. 10.
Figure 17A:
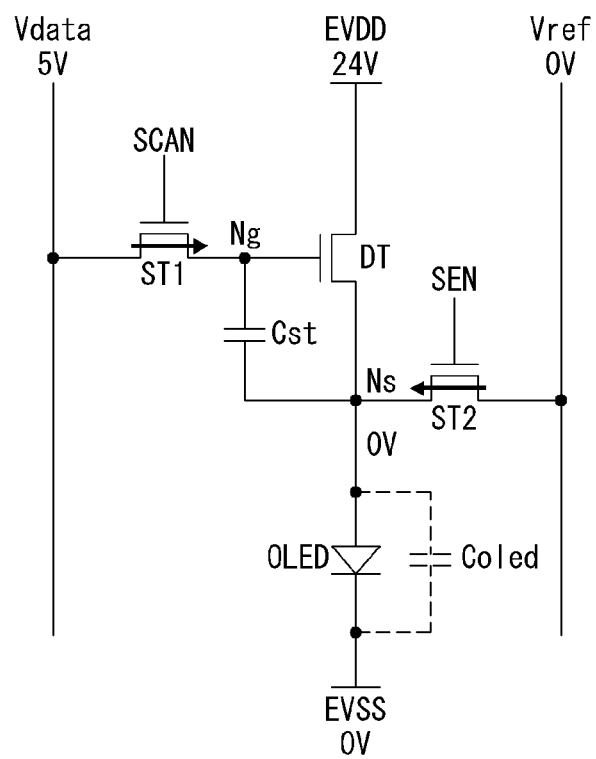
FIG. 17A shows an operation of a pixel during a reset period.
Figure 17B:
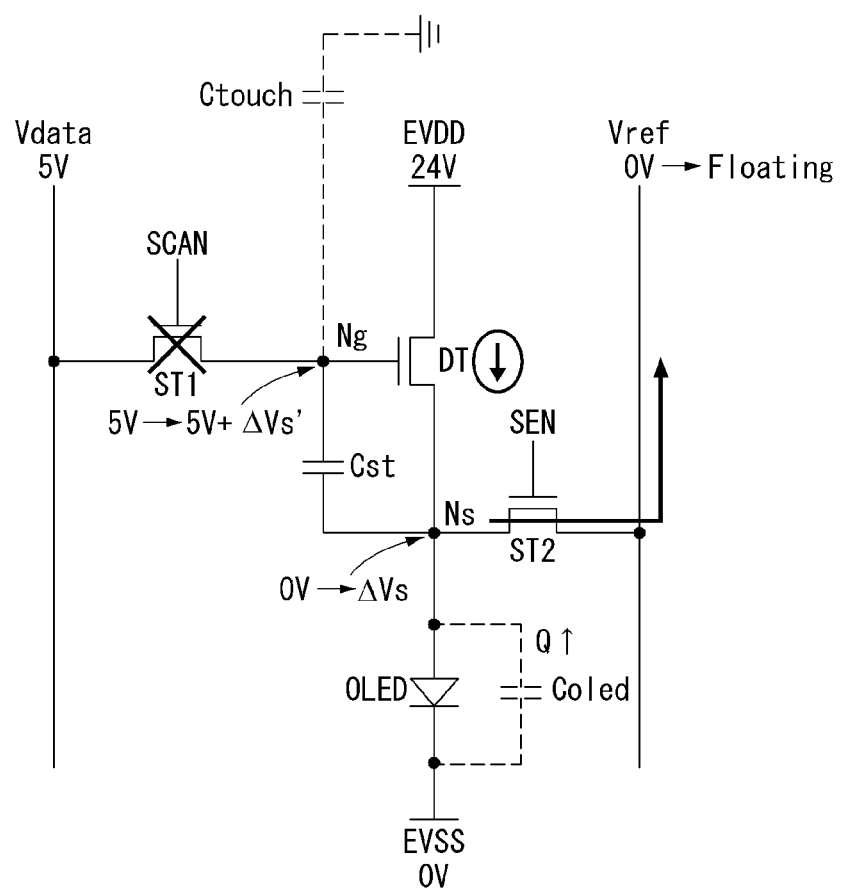
FIG. 17B shows an operation of a pixel during a sensing period.
Figure 18:
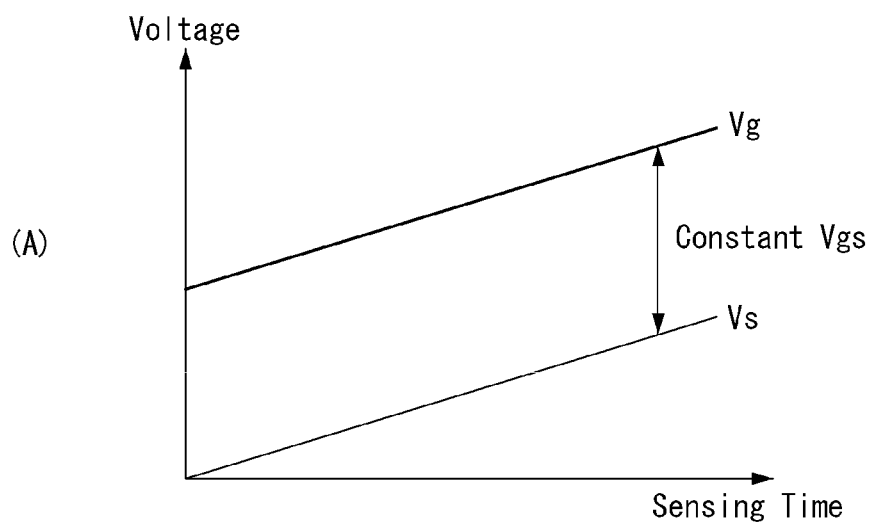
FIG. 18 shows voltages at a gate and a source of a driving transistor for sensing a touch according to the driving method of FIG. 10.
Figure 18:
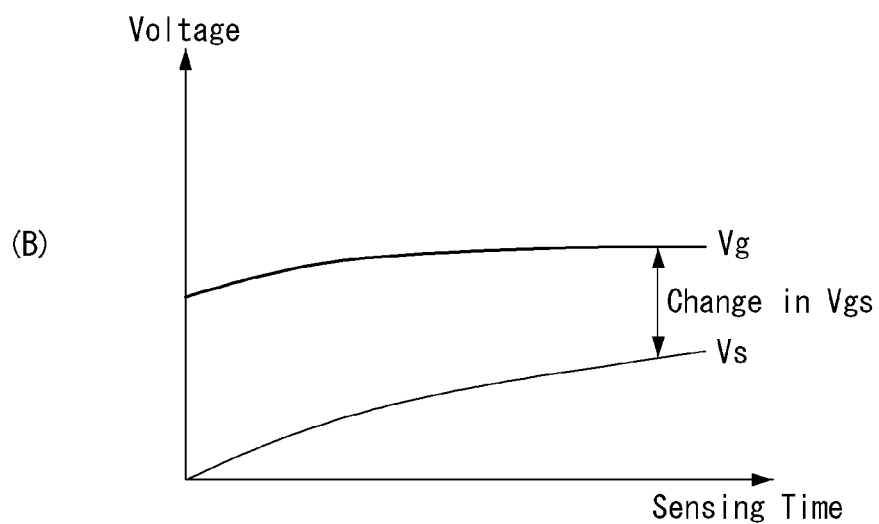
Figure 19:
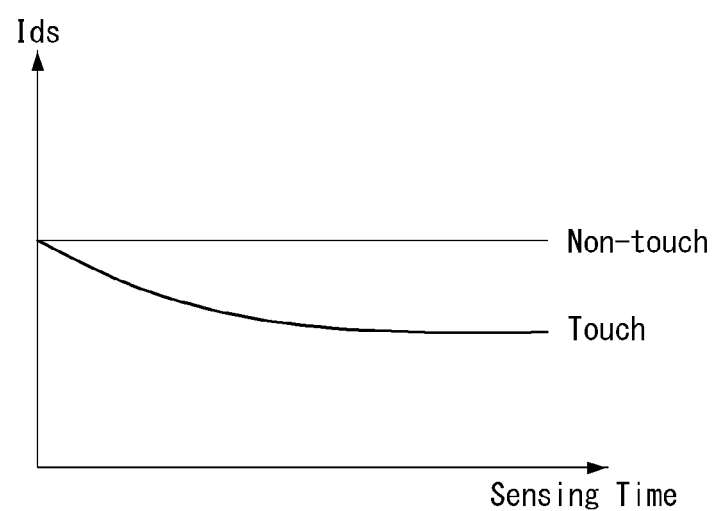
FIG. 19 shows current through the driving transistor for sensing a touch according to the driving method of FIG. 10.

FIG. 16 shows signal waveforms according to the driving method of FIG. 10. FIGS. 17A and 17B show how a pixel operates during a reset period and a sensing period. FIG. 18 shows voltages at a gate and a source of a driving transistor for sensing a touch according to the driving method of FIG. 10. FIG. 19 shows current through the driving transistor for sensing a touch according to the driving method of FIG. 10.

Referring to FIG. 16, one driving method for implementing the first sensing approach comprises a reset period ①  for touch sensing and a sensing period ②, and may further comprise an image restoration period ③.

Referring to FIGS. 16 and 17A, during the reset period ①, the first switching TFT ST1 is turned on in response to a scan control signal SCAN of ON level, the second switching TFT ST2 is turned on in response to a sensing control signal SEN of ON level, and the reference voltage control switch SW1 is turned on in response to a reference voltage control signal PRE of ON level. During the reset period ①, a data voltage VT (e.g., 5 V) for touch sensing is applied to the gate node Ng of the driving TFT DT, and a reference voltage Vref (e.g., 0 V) is applied to the source node Ns of the driving TFT DT. Thus, a Vgs required to turn on the driving TFT DT (which is higher than a threshold voltage Vth) is set.

Referring to FIGS. 16 and 17B, during the sensing period ②, the first switching TFT ST1 is turned off in response to a scan control signal SCAN of OFF level, the second switching TFT ST2 is turned on in response to a sensing control signal SEN of ON level, and the reference voltage control switch SW1 is turned off in response to a reference voltage control signal PRE of OFF level. During the sensing period ②, the gate node Ng of the driving TFT DT is disconnected from the data line and floats, and the source node Ns of the driving TFT DT is disconnected from the input terminal of reference voltage Vref and floats.

While the gate node Ng of the driving TFT DT and the source node Ns of the driving TFT DT are floating, the potential of the source node Ns of the driving TFT DT rises by ΔVs due to the Ids. In this case, if the touch capacitor Ctouch is not connected to the floating gate node Ng (that is, there is no touch input), the potential of the gate node Ng rises by ΔVs. Thus, as shown in (A) of FIG. 18, there is no change in the Vgs of the driving TFT DT, and the static current mode is maintained. In contrast, if the touch capacitor Ctouch is connected to the floating gate node Ng (that is, there is touch input), the potential of the gate node Ng rises by ΔVs', which is smaller than ΔVs, due to voltage division between the storage capacitor Cst and the touch capacitor Ctouch, and therefore, as shown in (B) of FIG. 18, the Vgs of the driving TFT DT decreases. Thus, as shown in FIG. 19, the Ids of the driving TFT DT of the touched pixel is lower than Ids of a driving TFT DT of the untouched pixel. A sampling unit samples the Ids of the driving TFT DT as a sensing value Vsen in response to a sampling signal SAM of ON level. In one aspect, the source node of the driving TFT DT is maintained below a turn-on voltage (e.g., 9 V) of the OLED during the reset period ① and the sensing period ②, such that the OLED does not emit light during the reset period ① and the sensing period ②.

The image restoration period ③ is needed to maintain image integrity before and after touch sensing. During the image restoration period ③, a data line and the gate node Ng of the driving TFT DT are electrically connected by the turn on of the first switching TFT ST1 in response to a scan control signal SCAN of ON level, a sensing line and the source node Ns of the driving TFT DT are electrically connected by the turn on of the second switching TFT ST2 in response to a sensing control signal SEN of ON level, and the input terminal of reference voltage Vref and the sensing line are electrically connected in response to a reference voltage control signal PRE of ON level. Accordingly, during the image restoration period ③, a data voltage VR for image restoration is applied to the gate node Ng of the driving TFT DT, and a reference voltage Vref is applied to the source node Ns of the driving TFT DT. The driving TFT DT allows for displaying the same image before and after touch sensing by supplying an Ids, determined by the difference between the data voltage VR for image restoration and the reference voltage Vref, to the OLED and causing the OLED to emit light.

[Second Driving Example for Implementing First Sensing Approach]

Figure 20:
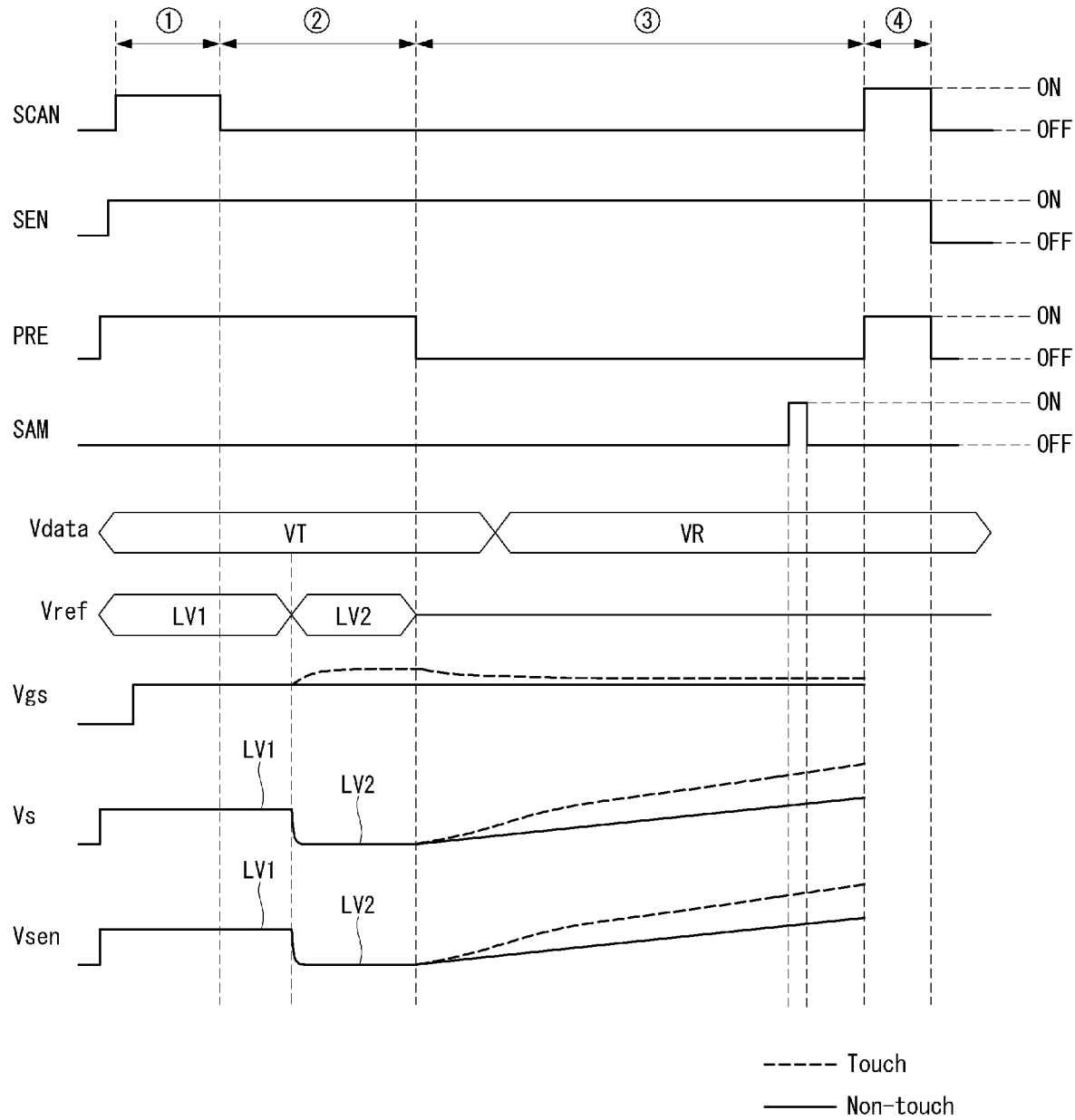
FIG. 20 shows signal waveforms according to the driving method of FIG. 11.
Figure 21A:
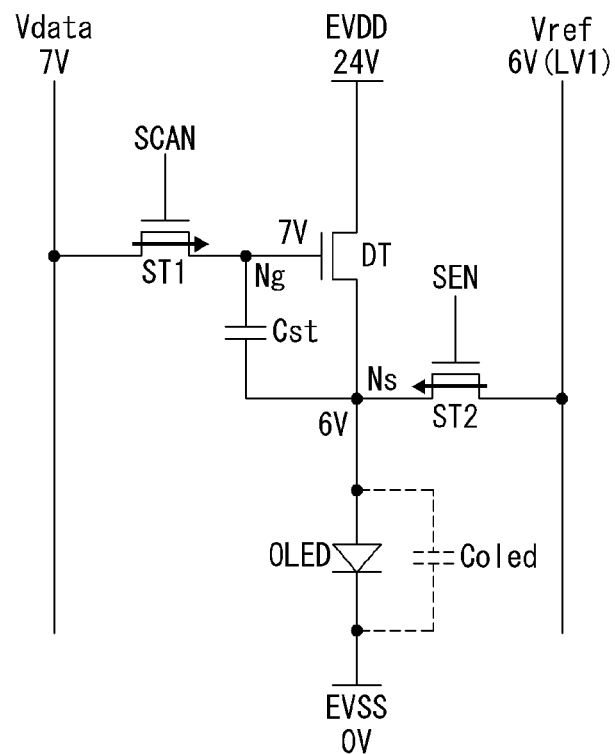
FIG. 21A shows how a pixel operates during a first reset period, according to the driving method of FIG. 11.
Figure 21B:
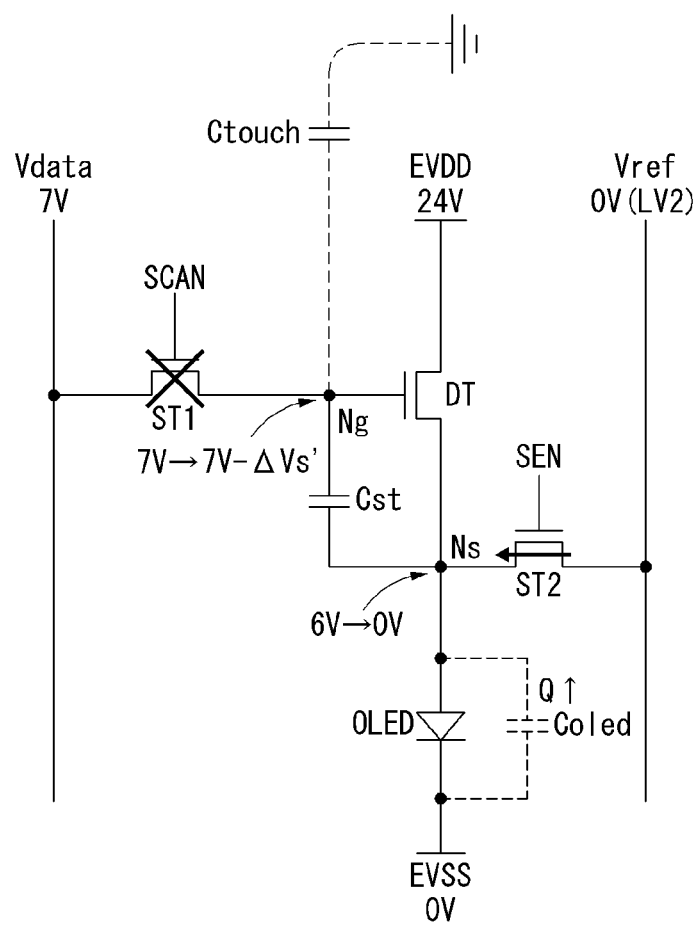
FIG. 21B shows how a pixel operates during a second reset period, according to the driving method of FIG. 11.
Figure 21C:
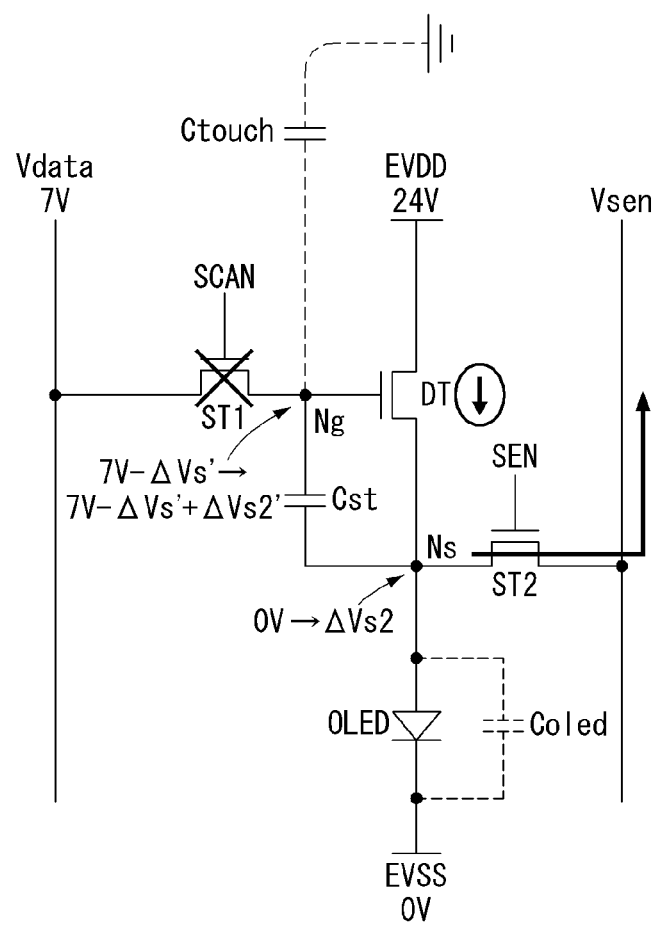
FIG. 21C shows how a pixel operates during a sensing period, according to the driving method of FIG. 11.
Figure 22:
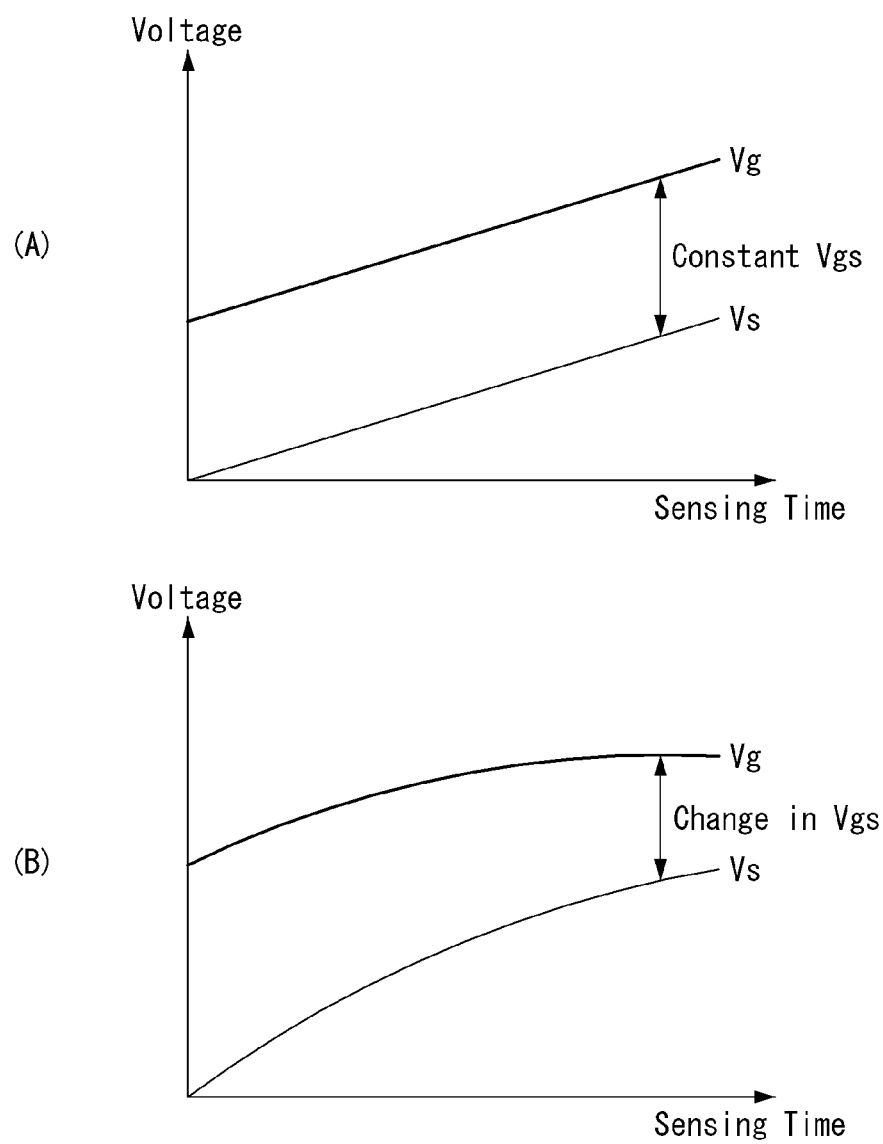
FIG. 22 shows voltages at a gate and a source of a driving transistor for sensing a touch according to the driving method of FIG. 11.
Figure 23:
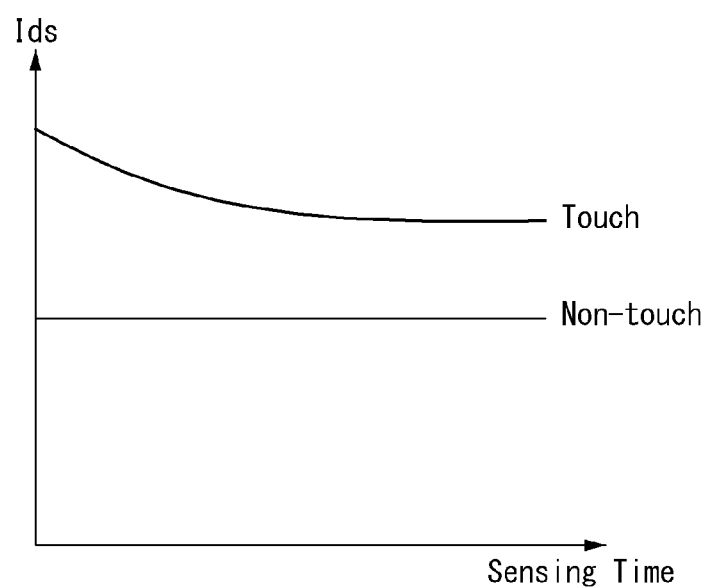
FIG. 23 shows current through the driving transistor for sensing a touch according to the driving method of FIG. 11.

FIG. 20 shows signal waveforms according to the driving method of FIG. 11. FIGS. 21A, 21B, and 21C show how a pixel operates during a first reset period, a second reset period, and a sensing period. FIG. 22 shows voltages at a gate and a source of a driving transistor for sensing a touch according to the driving method of FIG. 11. FIG. 23 shows current through the driving transistor for sensing a touch according to the driving method of FIG. 11.

Referring to FIG. 20, another driving method for implementing the first sensing approach comprises a first reset period ① and second reset period ② for touch sensing and a sensing period ③, and may further comprise an image restoration period ④.

Referring to FIGS. 20 and 21A, during the first reset period ①, the first switching TFT ST1 is turned on in response to a scan control signal SCAN of ON level, the second switching TFT ST2 is turned on in response to a sensing control signal SEN of ON level, and the reference voltage control switch SW1 is turned on in response to a reference voltage control signal PRE of ON level. During the first reset period ①, a data voltage VT (e.g., 7 V) for touch sensing is applied to the gate node Ng of the driving TFT DT, and a reference voltage Vref (e.g., 6 V) of first level (LV1) is applied to the source node Ns of the driving TFT DT. Thus, a Vgs required to turn on the driving TFT DT (which is higher than a threshold voltage Vth) is set.

Referring to FIGS. 20 and 21B, during the second reset period ②, the first switching TFT ST1 is turned off in response to a scan control signal SCAN of OFF level, the second switching TFT ST2 is turned on in response to a sensing control signal SEN of ON level, and the reference voltage control switch SW1 is turned on in response to a reference voltage control signal PRE of ON level. During the second reset period ②, the gate node Ng of the driving TFT DT is disconnected from the data line and floats, and a reference voltage Vref (e.g., 0 V) of second level (LV2), which is lower than the first level (LV1), is applied to the source node Ns of the driving TFT DT and therefore the potential decreases by ΔVs (e.g., 6 V).

During the second reset period ②, if the touch capacitor Ctouch is not connected to the floating gate node Ng (that is, there is no touch input), the potential of the gate node Ng falls by ΔVs (e.g., 6 V). Thus, there is no change in the Vgs of the driving TFT DT, and the static current mode is maintained. In contrast, if the touch capacitor Ctouch is connected to the floating gate node Ng (that is, there is touch input), the potential of the gate node Ng falls by ΔVs', which is smaller than ΔVs (e.g., 6 V), due to voltage division between the storage capacitor Cst and the touch capacitor Ctouch. Thus, the Vgs of the driving TFT DT increases, and as a result, the Ids of the driving TFT DT also increases. By inducing a rapid change in the Vgs of the driving TFT DT, the time needed for sensing can be reduced.

Referring to FIGS. 20 and 21C, during the sensing period ③, the first switching TFT ST1 is turned off in response to a scan control signal SCAN of OFF level, the second switching TFT ST2 is turned on in response to a sensing control signal SEN of ON level, and the reference voltage control switch SW1 is turned off in response to a reference voltage control signal PRE of OFF level. During the sensing period ③, the gate node Ng of the driving TFT DT is disconnected from the data line and floats, and the source node Ns of the driving TFT DT is disconnected from the input terminal of reference voltage Vref and floats.

While the gate node Ng of the driving TFT DT and the source node Ns of the driving TFT DT are floating, the potential of the source node Ns of the driving TFT DT rises by ΔVs2 due to the Ids. In this case, if the touch capacitor Ctouch is not connected to the floating gate node Ng (that is, there is no touch input), the potential of the gate node Ng rises by ΔVs2. Thus, as shown in (A) of FIG. 22, there is no change in the Vgs of the driving TFT DT, and the static current mode is maintained. In contrast, if the touch capacitor Ctouch is connected to the floating gate node Ng (that is, there is touch input), the potential of the gate node Ng rises by ΔVs2', which is smaller than ΔVs2, due to voltage division between the storage capacitor Cst and the touch capacitor Ctouch, and therefore, as shown in (B) of FIG. 22, the Vgs of the driving TFT DT changes. The Vgs of a driving TFT DT to which touch input is applied already has increased relatively in the second reset period ②, compared to the Vgs of a driving TFT DT to which no touch input is applied. Thus, even if the Vgs of the driving TFT DT to which touch input is applied changes to a lower level, it is still higher than that of the driving TFT DT to which no touch input is applied. Thus, as shown in FIG. 23 the Ids of the driving TFT DT of the touched pixel is higher than Ids of a driving TFT DT of the untouched pixel. A sampling unit samples the Ids of the driving TFT DT as a sensing value Vsen in response to a sampling signal SAM of ON level. In one aspect, the source node of the driving TFT DT is maintained below a turn-on voltage (e.g., 9 V) of the OLED during the first reset period ①, the second reset period ②, and the sensing period ③, such that the OLED does not emit light during the first reset period ①, the second reset period ②, and the sensing period ③.

The operational effects of the image restoration period ④ are identical to those set forth above.

[First Driving Example for Implementing Second Sensing Approach]

Figure 24:
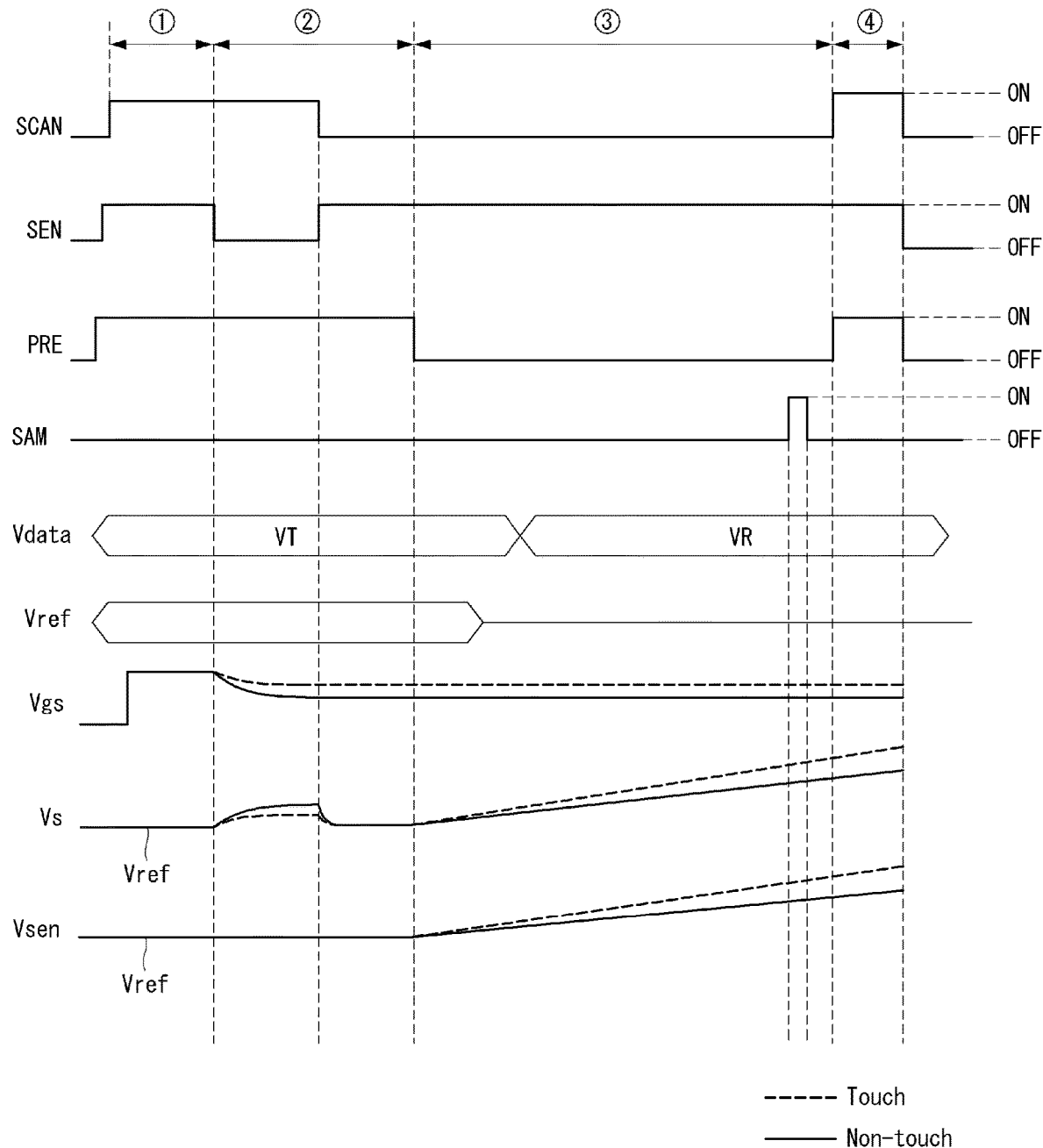
FIG. 24 shows signal waveforms according to the driving method of FIG. 14.
Figure 25A:
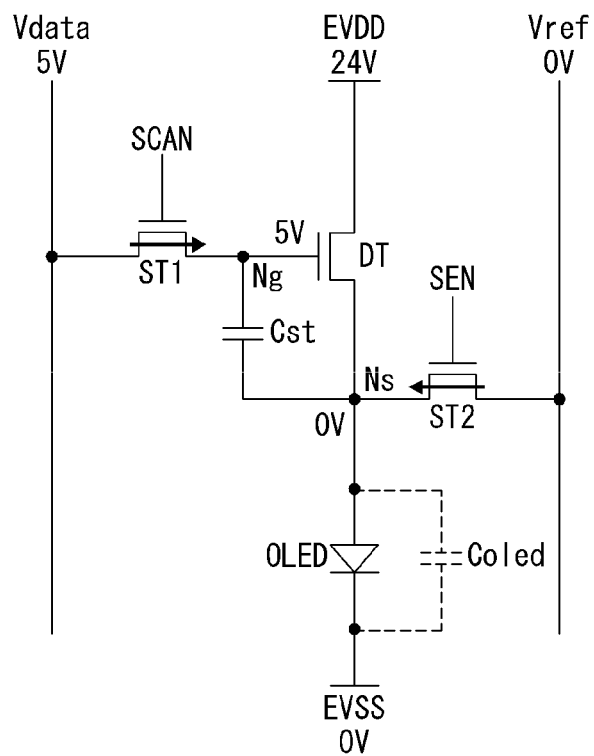
FIG. 25A shows how a pixel operates during a first reset period, according to the driving method of FIG. 14.
Figure 25B:
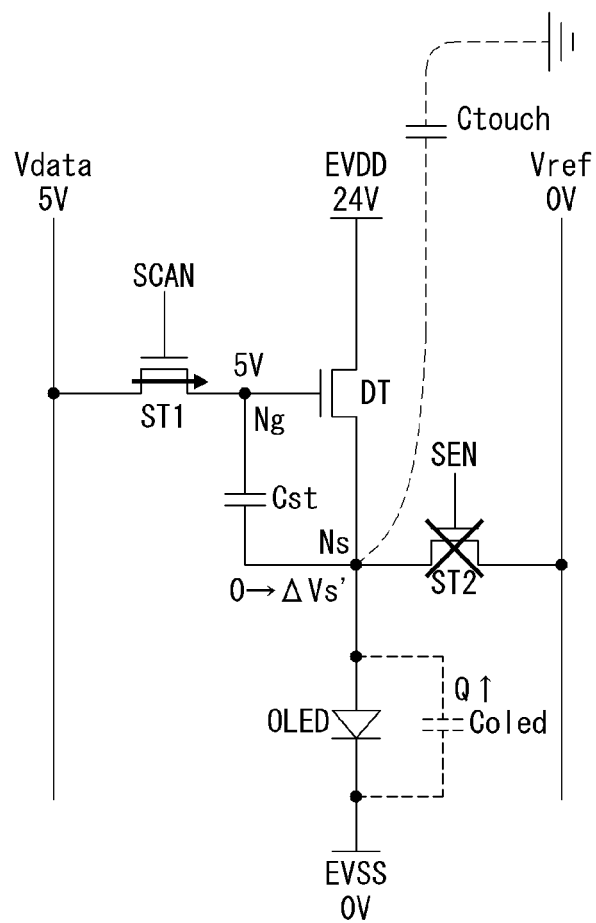
FIG. 25B shows how a pixel operates during a second reset period, according to the driving method of FIG. 14.
Figure 25C:
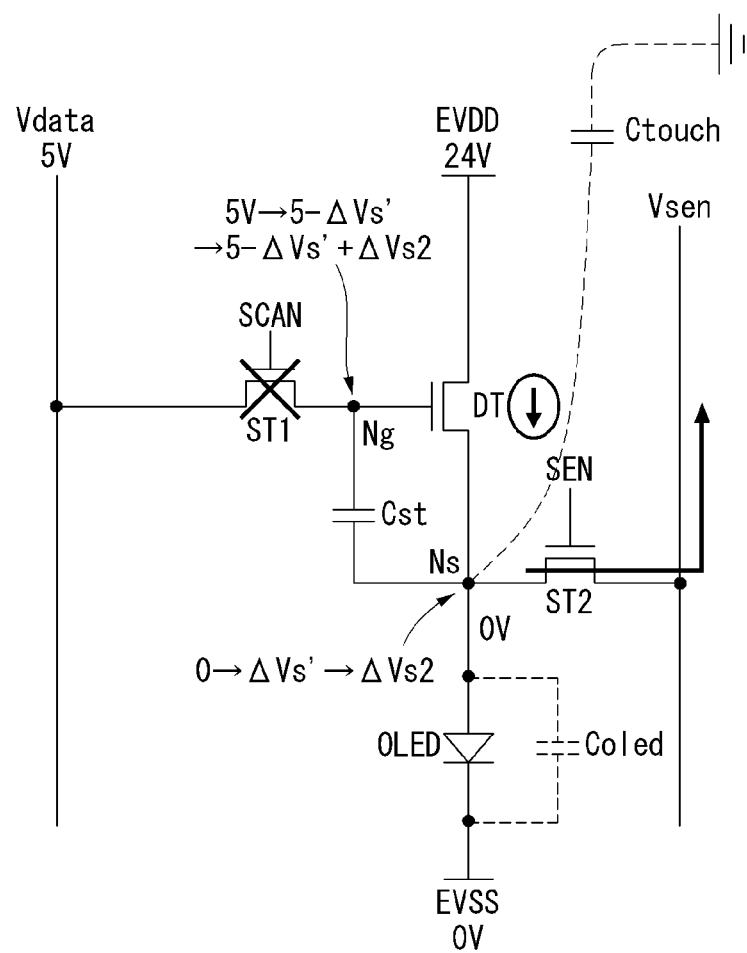
FIG. 25C shows how a pixel operates during a sensing period, according to the driving method of FIG. 14.
Figure 26:
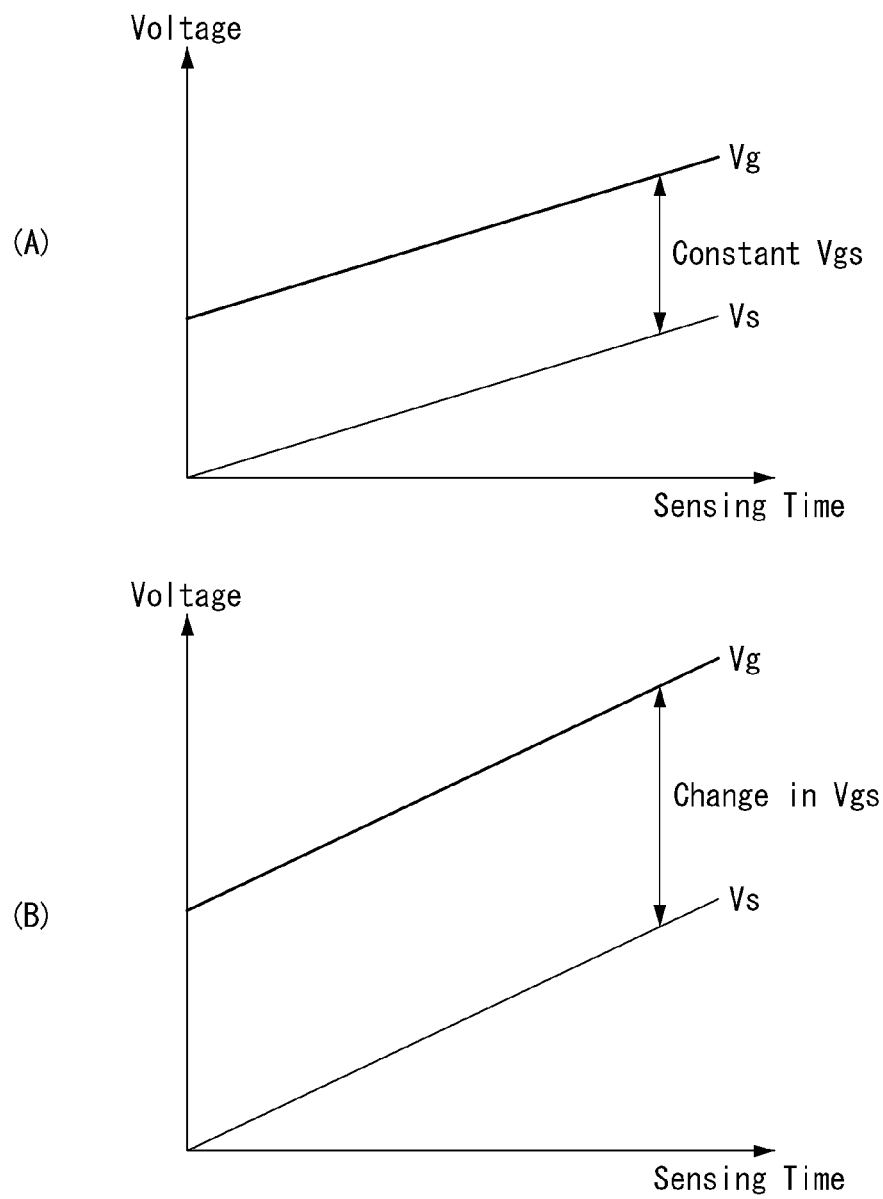
FIG. 26 shows voltages at a gate and a source of a driving transistor for sensing a touch according to the driving method of FIG. 14.
Figure 27:
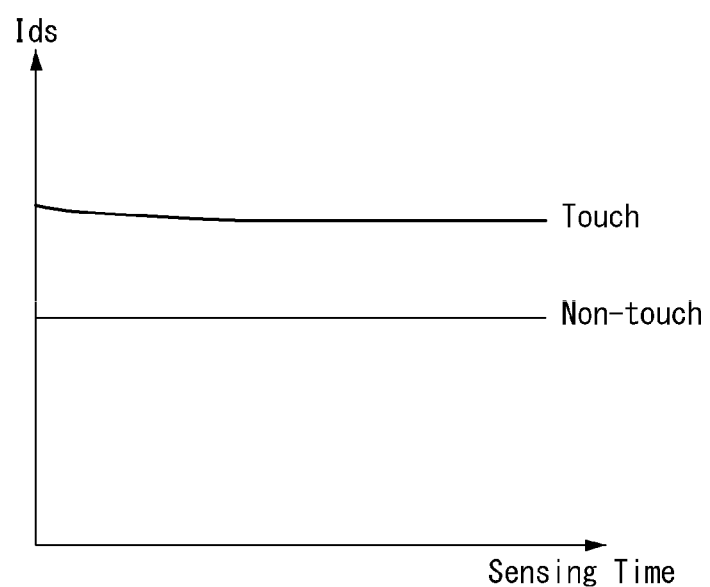
FIG. 27 shows current through the driving transistor for sensing a touch according to the driving method of FIG. 14.

FIG. 24 shows signal waveforms according to the driving method of FIG. 14. FIGS. 25A, 25B, and 25C show how a pixel operates during a first reset period, a second reset period, and a sensing period. FIG. 26 shows voltages at a gate and a source of a driving transistor for sensing a touch according to the driving method of FIG. 14. FIG. 27 shows current through the driving transistor for sensing a touch according to the driving method of FIG. 14.

Referring to FIG. 24, one driving method for implementing the second sensing approach comprises a first reset period ① and second reset period ② for touch sensing and a sensing period ③, and may further comprise an image restoration period ④.

Referring to FIGS. 24 and 25A, during the first reset period ①, the first switching TFT ST1 is turned on in response to a scan control signal SCAN of ON level, the second switching TFT ST2 is turned on in response to a sensing control signal SEN of ON level, and the reference voltage control switch SW1 is turned on in response to a reference voltage control signal PRE of ON level. During the first reset period ①, a data voltage VT (e.g., 5 V) for touch sensing is applied to the gate node Ng of the driving TFT DT, and a reference voltage Vref (e.g., 0 V) is applied to the source node Ns of the driving TFT DT. Thus, a Vgs required to turn on the driving TFT DT (which is higher than a threshold voltage Vth) is set.

Referring to FIGS. 24 and 25B, during the second reset period ②, the first switching TFT ST1 is turned on in response to a scan control signal SCAN of ON level, the second switching TFT ST2 is turned off in response to a sensing control signal SEN of OFF level, and the reference voltage control switch SW1 is turned on in response to a reference voltage control signal PRE of ON level.

During the second reset period ②, the potential of the gate node Ng of the driving TFT DT is fixed at the data voltage VT (e.g., 5 V) for touch sensing, and the source node Ns of the driving TFT DT floats. During the second reset period ②, an Ids flows through the driving TFT DT by the Vgs of the driving TFT DT, which is set in the first reset period, and the potential Vs of the source node Ns rises by ΔVs' due to the Ids. That is, the driving TFT DT operates as a source follower type during the second reset period ②, thus inducing a change in the Vgs of the driving TFT DT.

During the second reset period ②, the amount of increase in the potential Vs of the source node Ns differs depending on whether the touch capacitor Ctouch is connected to the floating source node Ns (that is, there is touch input) or not (that is, there is no touch input). Due to voltage division between a parasitic capacitor Coled at two ends of the OLED and the touch capacitor Ctouch, the amount ΔVs' of increase in the potential Vs of the source node Ns observed when there is touch input becomes Ids*Δt/(COLED+CTOUCH). On the contrary, the amount ΔVs' of increase in the potential Vs of the source node Ns observed when there is no touch input is not affected by the touch capacitor Ctouch, and therefore the amount ΔVs' without the touch capacitor Ctouch becomes Ids*Δt/COLED, which is greater than that observed when there is touch input. That is, when the touch capacitor Ctouch is connected to the floating source node Ns, the potential Vs of the source node Ns rises by a smaller amount than that observed when the touch capacitor Ctouch is not connected to the floating source node Ns. Thus, the Vgs of the driving TFT DT increases according to the touch capacitor Ctouch, and as a result, the Ids of the driving TFT DT also increases.

Referring to FIGS. 24 and 25C, during the sensing period ③, the first switching TFT ST1 is turned off in response to a scan control signal SCAN of OFF level, the second switching TFT ST2 is turned on in response to a sensing control signal SEN of ON level, and the reference voltage control switch SW1 is turned off in response to a reference voltage control signal PRE of OFF level. During the sensing period ③, the gate node Ng of the driving TFT DT is disconnected from the data line and floats, and the source node Ns of the driving TFT DT is disconnected from the input terminal of reference voltage Vref and floats.

While the gate node Ng of the driving TFT DT and the source node Ns of the driving TFT DT are floating, the potential of the source node Ns of the driving TFT DT rises due to the Ids. If the touch capacitor Ctouch is not connected to the source node Ns (that is, there is no touch input), the amount of increase in the potential of the source node Ns is equal to a first value, and the potential of the gate node Ng rises by the first value. Therefore, the Vgs of the driving TFT DT is kept at a second value, as shown in (A) of FIG. 26. In contrast, if the touch capacitor Ctouch is connected to the source node Ns (that is, there is touch input), the amount of increase in the potential of the source node Ns becomes ΔVs2, which is smaller than the first value, due to voltage division between the parasitic capacitor Coled at two ends of the OLED and the touch capacitor Ctouch, the potential of the gate node Ng rises by ΔVs2, and therefore the Vgs of the driving TFT DT changes to a value greater than the second value, as shown in (B) of FIG. 26. In one aspect, the source node of the driving TFT DT is maintained below a turn-on voltage (e.g., 9 V) of the OLED during the first reset period ①, the second reset period ②, and the sensing period ③, such that the OLED does not emit light during the first reset period ①, the second reset period ②, and the sensing period ③.

As shown in FIG. 27, the Ids of the driving TFT DT of the touched pixel is higher than Ids of a driving TFT DT of the untouched pixel. A sampling unit samples the Ids of the driving TFT DT as a sensing value Vsen in response to a sampling signal SAM of ON level.

The operational effects of the image restoration period ④ are identical to those set forth above.

[Second Driving Example for Implementing Second Sensing Approach]

Figure 28:
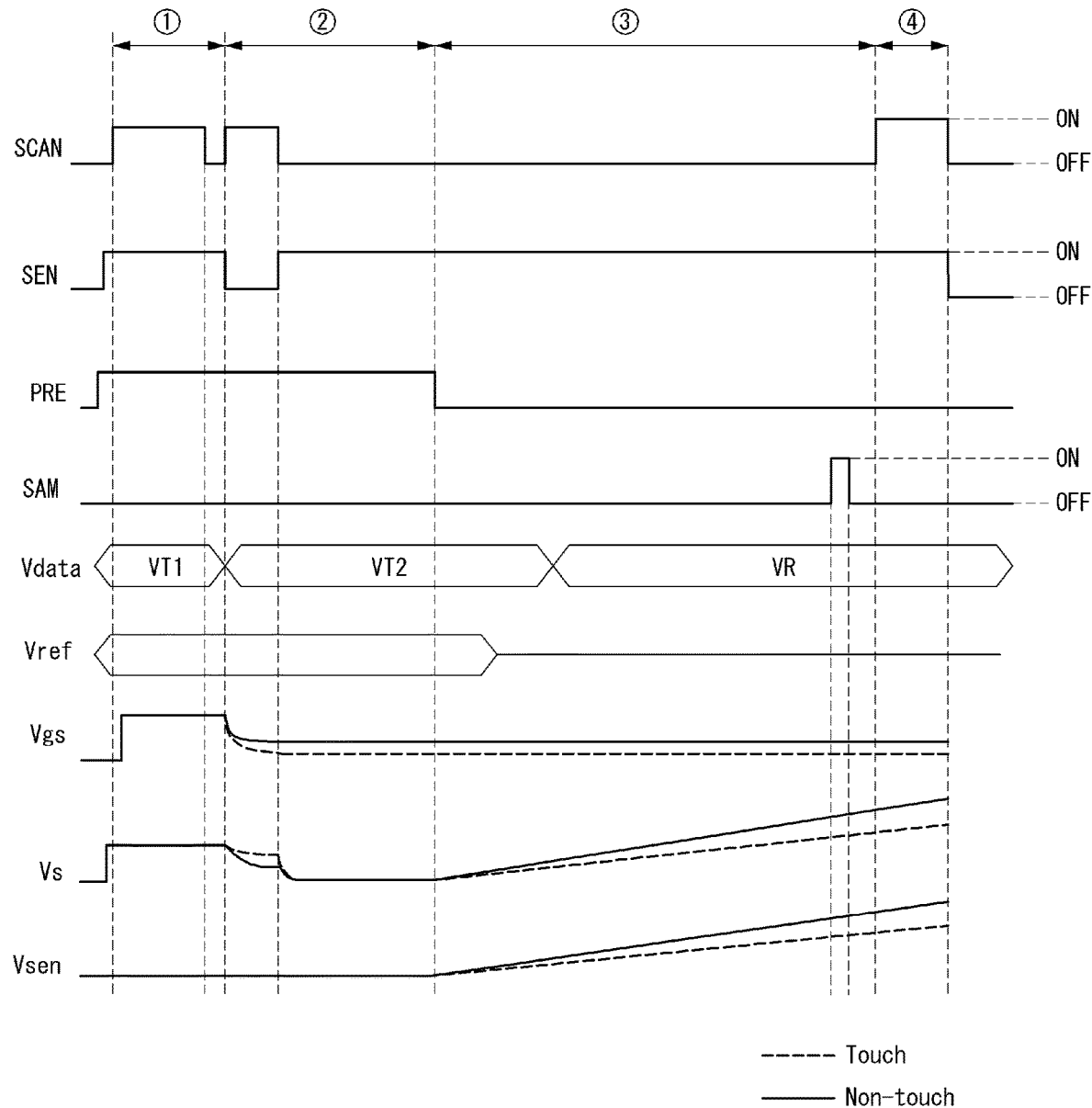
FIG. 28 shows signal waveforms according to the driving method of FIG. 15.

FIG. 28 shows signal waveforms according to the driving method of FIG. 15.

Referring to FIG. 28, another driving method for implementing the second sensing approach comprises a first reset period ① and second reset period ② for touch sensing and a sensing period ③, and may further comprise an image restoration period ④.

This driving method is different from the driving method of FIG. 24 in that, during the second reset period ②, a rapid change in the Vgs of the driving TFT DT is induced by causing the source node Ns of the driving TFT DT to float to operate the driving TFT DT as a source follower type and varying (decreasing or increasing) the data voltage for touch sensing, and the other configuration elements are substantially identical to those explained with reference to FIG. 24.

Concretely, in this driving method, during the second reset period ②, the data voltage for touch sensing applied to the gate node Ng may decrease by ΔVg while the source node Ns of the driving TFT DT is floating. In this case, if the touch capacitor Ctouch is not connected to the floating source node Ns (that is, there is no touch input), the potential of the source node Ns falls by ΔVg and gradually rises according to the source follower method. In contrast, if the touch capacitor Ctouch is connected to the floating source node Ns (that is, there is touch input), the potential of the source node Ns falls by ΔVg', which is smaller than ΔVg, due to voltage division between the parasitic capacitor Coled at two ends of the OLED and the touch capacitor Ctouch. Thus, the Vgs of the driving TFT DT decreases according to the touch capacitor Ctouch, and as a result, the Ids of the driving TFT DT also decreases accordingly. By inducing a rapid change in the Vgs of the driving TFT DT, the time needed for sensing can be reduced. In one aspect, the source node of the driving TFT DT is maintained below a turn-on voltage (e.g., 9 V) of the OLED during the first reset period ①, the second reset period ②, and the sensing period ③, such that the OLED does not emit light during the first reset period ①, the second reset period ②, and the sensing period ③.

Figure 29:
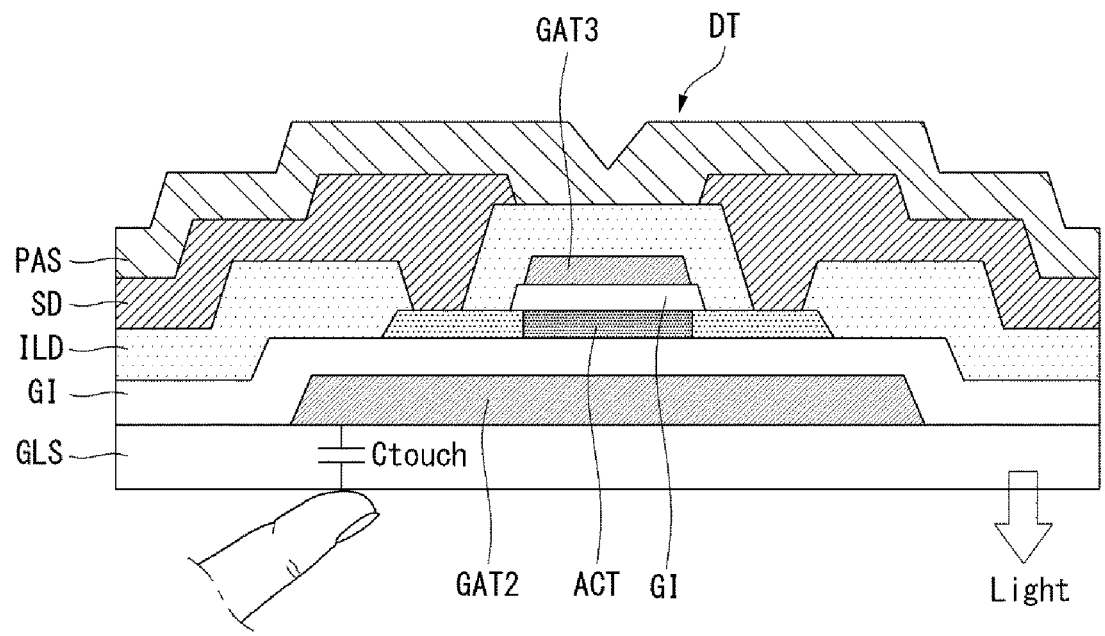
FIG. 29 shows an example of a cross-section structure of the driving TFT of a pixel.
Figure 30:
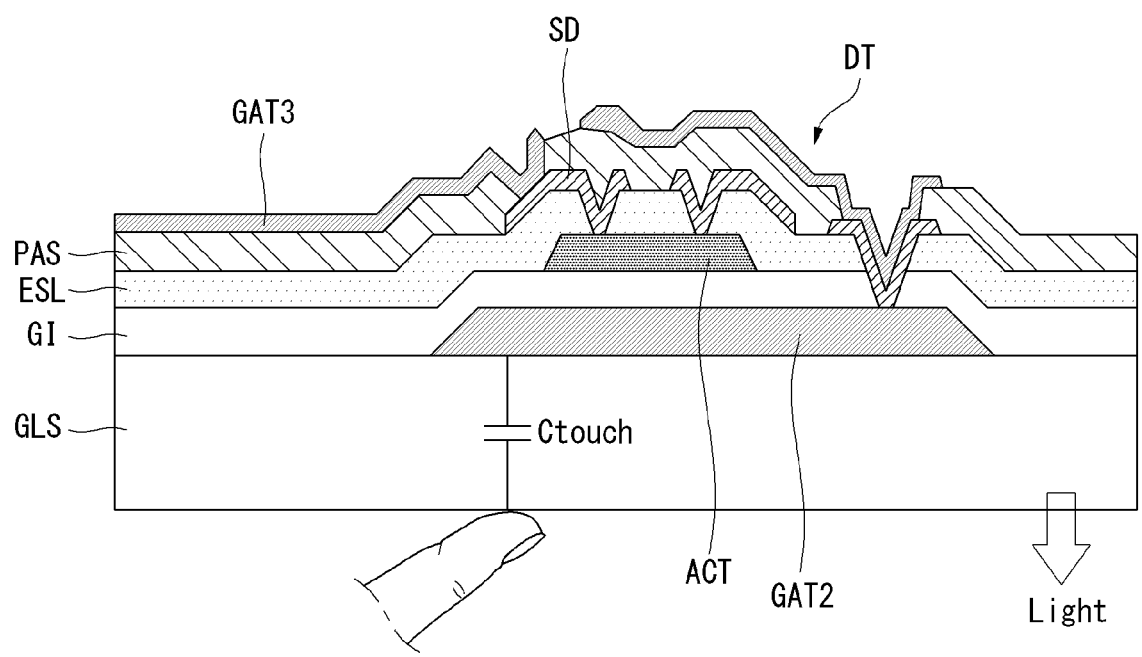
FIG. 30 shows another example of a cross-section structure of the driving TFT of a pixel.
Figure 31:
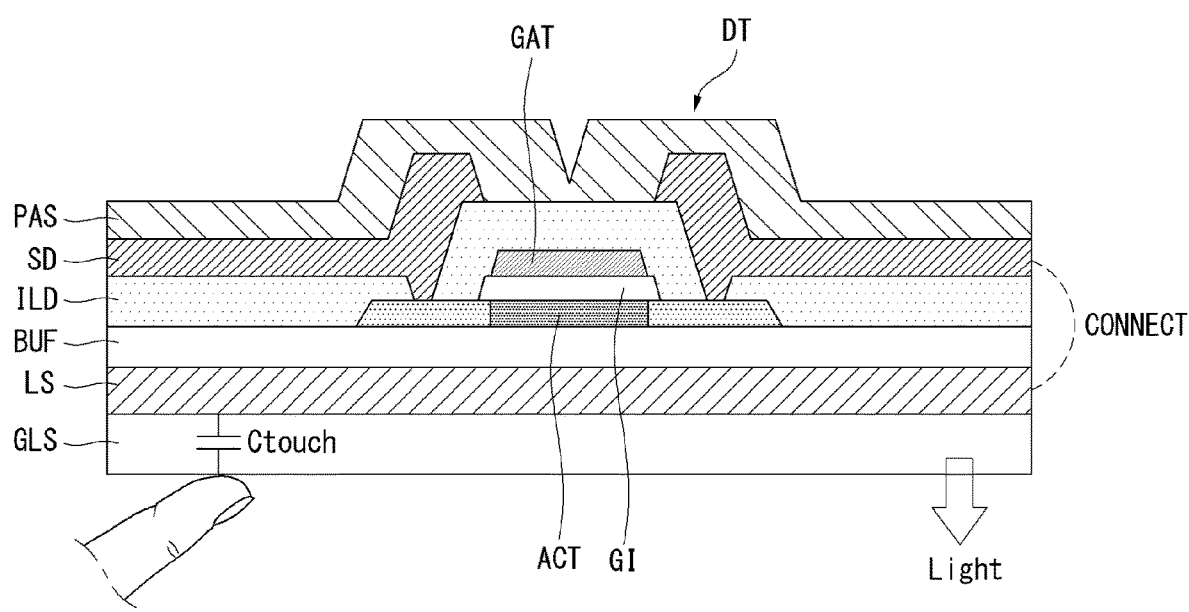
FIG. 31 shows another example of a cross-section structure of the driving TFT of a pixel.

FIGS. 29 to 31 show various examples of a cross-section structure of the driving TFT of a pixel.

In the above-described first sensing approach, the touch capacitor Ctouch is connected between the gate node Ng of the driving TFT DT and a finger. Accordingly, the driving TFT DT needs to be configured in such a manner that the gate electrode GAT serves as an electrode of the touch capacitor Ctouch, in order to implement the first sensing approach. An example of the structure of the driving TFT DT is as shown in FIGS. 29 and 30, and the driving TFT DT may have any structure as long as the gate electrode GAT is exposed toward the light-emitting face through the substrate GLS.

In the above-described second sensing approach, the touch capacitor Ctouch is connected between the source node Ns of the driving TFT DT and a finger. Accordingly, the driving TFT DT needs to be configured in such a manner that the source electrode SD serves as an electrode of the touch capacitor Ctouch, in order to implement the second sensing approach. An example of the structure of the driving TFT DT is as shown in FIG. 31, and the driving TFT DT may have any structure as long as the source electrode SD is exposed toward the light-emitting face through the substrate GLS. In FIG. 31, a metal light blocking pattern LS electrically connected to the source electrode SD is exposed to the light-emitting face through the substrate GLS.

In FIGS. 29 to 31, GLS denotes the substrate, LS denotes the metal light blocking pattern, ACT denotes an active layer of the driving TFT, GAT, GAT1, GAT2 and GAT3 denote the gate electrode, SD denotes the source electrode (or drain electrode) of the driving TFT, and GI, BUF, ILD, ESL, and PAS denote an insulating film.

As described above, the touch sensor integrated display device requires no touch electrodes and sensor lines. Thus, various embodiments of the touch sensor integrated display device disclosed herein can minimize additional elements for touch sensing because it senses touch input using an external compensation-type pixel array.

Moreover, the touch sensor integrated display device of this invention senses a change in the Ids of the driving TFT resulting from a change in the Vgs of the driving TFT caused by touch input. Thus, the Ids is sensed as an amplified current even if the amount of Vgs change caused by touch input is small, and this offers an advantage to enhancing sensing capabilities.

From the foregoing description, those skilled in the art will readily appreciate that various changes and modifications can be made without departing from the technical idea of the present invention. For example, it should be understood that the number of touch electrodes set forth herein is only for illustrative purposes and is not intended to limit the scope of this invention. Therefore, the technical scope of the present invention is not limited to the contents described in the detailed description of the specification but defined by the appended claims.

What is claimed is:

1. A touch sensor integrated display device comprising:
   a display panel with a plurality of pixels, each pixel of the plurality of pixels comprising:
      an organic light emitting diode (OLED);
      a driving thin film transistor (TFT) for applying a source-drain current (Ids) to the OLED included in the pixel;
      a first switching TFT connected to a gate node of the driving TFT;
      a second switching TFT connected to a source node of the driving TFT; and
      a storage capacitor connected between the gate node and the source node of the driving TFT;
   a gate drive circuit configured to generate a scan control signal and a sensing control signal and to supply the scan control signal to a plurality of first gate lines and to supply the sensing control signal to a plurality of second gate lines on the display panel;
   a data drive circuit configured to set a gate-source voltage (Vgs) to turn on the driving TFT of at least one pixel of the plurality of pixels by applying a data voltage for touch sensing to the gate node of the driving TFT of the at least one pixel of the plurality of pixels through a data line and a reference voltage to the source node of the driving TFT of the at least one pixel of the plurality of pixels through a sensing line, during a reset period based on the scan control signal and the sensing control signal, and to output a sensing value by sensing a change in the Ids of the driving TFT of the at least one pixel of the plurality of pixels caused by a touch input, during a sensing period subsequent to the reset period; and
   a timing controller configured to compare the sensing value with a reference value to detect the touch input,
   wherein during an image restoration period that is subsequent to the sensing period, the gate drive circuit is further configured to connect the data line and the gate node of the driving TFT of the at least one pixel of the plurality of pixels by applying the scan control signal of an ON level to the first switching TFT, and to electrically connect the sensing line and the source node of the driving TFT of the at least one pixel of the plurality of pixels by applying the sensing control signal of an ON level to the second switching TFT such that the first switching TFT is on while the second switching TFT is on during the image restoration period, and the data drive circuit is further configured to apply the data voltage for an image restoration to the gate node of the driving TFT of the at least one pixel of the plurality of pixels and the reference voltage to the source node of the driving TFT of the at least one pixel of the plurality of pixels.

2. The touch sensor integrated display device of claim 1, wherein the Vgs of the driving TFT of the at least one pixel of the plurality of pixels changes due to the touch input, and the change in the Vgs of the driving TFT of the at least one pixel of the plurality of pixels leads to a change in the Ids of the driving TFT of the at least one pixel of the plurality of pixels.

3. The touch sensor integrated display device of claim 2, wherein for the at least one pixel of the plurality of pixels the first switching TFT is configured to switch on an electrical connection between the data line and the gate node of the driving TFT of the at least one pixel of the plurality of pixels in response to the scan control signal from a first gate line of the plurality of gate lines; and
wherein the second switching TFT is configured to switch on an electrical connection between the sensing line and the source node of the driving TFT of the at least one pixel of the plurality of pixels in response to the sensing control signal from a second gate line of the plurality of gate lines.

4. The touch sensor integrated display device of claim 3, wherein, during the sensing period, the gate drive circuit is further configured to cut off the electrical connection between the data line and the gate node of the driving TFT of the at least one pixel of the plurality of pixels by applying the scan control signal of an OFF level to the first switching TFT and to electrically connect the sensing line and the source node of the driving TFT of the at least one pixel of the plurality of pixels by applying the sensing control signal of the ON level to the second switching TFT, the gate drive circuit to cut off an electrical connection between a reference voltage input terminal for supplying the reference voltage and the sensing line.

5. The touch sensor integrated display device of claim 3, wherein a touch capacitor caused by the touch input is connected to the gate node of the driving TFT of the at least one pixel of the plurality of pixels to change the Vgs of the driving TFT of the at least one pixel of the plurality of pixels.

6. The touch sensor integrated display device of claim 5, wherein the reset period comprises a first reset period and a second reset period subsequent to the first reset period, and
the gate drive circuit is further configured to electrically connect the data line and the gate node of the driving TFT of the at least one pixel of the plurality of pixels by applying the scan control signal of the ON level to the first switching TFT during the first reset period, to cut off the electrical connection between the data line and the gate node of the driving TFT of the at least one pixel of the plurality of pixels by applying the scan control signal of an OFF level to the first switching TFT during the second reset period, and to electrically connect the sensing line and the source node of the driving TFT of the at least one pixel of the plurality of pixels by applying the sensing control signal of the ON level to the second switching TFT during the first reset period and the second reset period, and
the data drive circuit is further configured to set the Vgs to turn on the driving TFT of the at least one pixel of the plurality of pixels by applying the data voltage for touch sensing to the gate node of the driving TFT of the at least one pixel of the plurality of pixels and the reference voltage of a first level to the source node of the driving TFT of the at least one pixel of the plurality of pixels during the first reset period, and to induce a change in the Vgs of the driving TFT of the at least one pixel of the plurality of pixels by applying the reference voltage of a second level, different from the first level, to the source node of the driving TFT of the at least one pixel of the plurality of pixels during the second reset period.

7. The touch sensor integrated display device of claim 3, wherein a touch capacitor caused by the touch input is connected to the source node of the driving TFT of the at least one pixel of the plurality of pixels to change the Vgs of the driving TFT.

8. The touch sensor integrated display device of claim 7, wherein the reset period comprises a first reset period and a second reset period subsequent to the first reset period, and
the data drive circuit is further configured to set the Vgs to turn on the driving TFT of the at least one pixel of the plurality of pixels by applying the data voltage for touch sensing to the gate node of the driving TFT of the at least one pixel of the plurality of pixels and the reference voltage to the source node of the driving TFT of the at least one pixel of the plurality of pixels, during the first reset period, and
the gate drive circuit is further configured to induce a change in the Vgs of the driving TFT of the at least one pixel of the plurality of pixels by electrically connecting the data line and the gate node of the driving TFT of the at least one pixel of the plurality of pixels by applying the scan control signal of the ON level to the first switching TFT, during the first and second reset periods, electrically connecting the sensing line and the source node of the driving TFT of the at least one pixel of the plurality of pixels by applying the sensing control signal of the ON level to the second switching TFT, during the first reset period, and cutting off the electrical connection between the sensing line and the source node of the driving TFT of the at least one pixel of the plurality of pixels by applying the sensing control signal of an OFF level to the second switching TFT, during the second reset period.

9. The touch sensor integrated display device of claim 7, wherein the reset period comprises a first reset period and a second reset period subsequent to the first reset period, and
the gate drive circuit is further configured to electrically connect the data line and the gate node of the driving TFT of the at least one pixel of the plurality of pixels by applying the scan control signal of the ON level to the first switching TFT, during the first and second reset periods, to electrically connect the sensing line and the source node of the driving TFT by applying the sensing control signal of the ON level to the second switching TFT, during the first reset period, and to cut off the electrical connection between the sensing line and the source node of the driving TFT of the at least one pixel of the plurality of pixels by applying the sensing control signal of an OFF level to the second switching TFT, during the second reset period, and the data drive circuit is further configured to set the Vgs to turn on the driving TFT by applying the data voltage of a first level for touch sensing to the gate node of the driving TFT of the at least one pixel of the plurality of pixels and the reference voltage to the source node of the driving TFT of the at least one pixel of the plurality of pixels, during the first reset period, and to induce a change in the Vgs of the driving TFT of the at least one pixel of the plurality of pixels by applying the data voltage of a second level for touch sensing, different from the first level, to the gate node of the driving TFT of the at least one pixel of the plurality of pixels, during the second reset period.

10. A touch sensor integrated display device comprising:

a display panel with a plurality of pixels, each pixel of the plurality of pixels comprising:

an organic light emitting diode (OLED);

a driving thin film transistor (TFT) for applying a source-drain current (Ids) to the OLED included in the pixel;

a first switching TFT connected to a gate node of the driving TFT;

a second switching TFT connected to a source node of the driving TFT; and a storage capacitor connected between the gate node and the source node of the driving TFT;

a gate drive circuit configured to generate a scan control signal and a sensing control signal and to supply the scan control signal to a plurality of first gate lines and to supply the sensing control signal to a plurality of second gate lines on the display panel;

a data drive circuit including:

a sample and hold circuit configured to sample and hold a voltage of the source node of the driving TFT of at least one pixel of the plurality of pixel;

a first control switch including a first side and a second side, the first side connected to the reference voltage, and the second side connected to the second switching TFT; and a second control switch including a first side and a second side, the first side of the second control switch connected to the sample and hold circuit and the second side of the second control switch connected to the second switching TFT and the second side of the first control switch, wherein the data drive circuit is configured to set a gate-source voltage (Vgs) to turn on the driving TFT of the at least one pixel of the plurality of pixels by applying a data voltage for touch sensing to the gate node of the driving TFT of the at least one pixel of the plurality of pixels through a data line and applying a reference voltage to the source node of the driving TFT of the at least one pixel of the plurality of pixels through a sensing line, during a reset period based on the scan control signal and the sensing control signal, wherein the reference voltage is applied to the source node of the driving TFT by turning on the first control switch and turning off the second control switch during the reset period, the first control switch connecting the reference voltage to the source node of the driving TFT, and wherein the data driver circuit is further configured to output a sensing value by sensing a change in the Ids of the driving TFT of the at least one pixel of the plurality of pixels caused by a touch input, during a sensing period subsequent to the reset period, the change in the Ids of the driving TFT sensed by turning off the first control switch and turning on the second control switch during the sensing period, the second control switch connecting the sample and hold circuit to the source node of the driving TFT such that the sample and hold circuit samples and holds the voltage of the source node of the driving TFT during the sensing period, the voltage of the source node during the sensing period indicative of the change in the Ids of the driving TFT; and a timing controller configured to compare the sensing value with a reference value to detect the touch input.

* * * * *